(12) United States Patent
Higashimori

(10) Patent No.: US 10,472,983 B2
(45) Date of Patent: Nov. 12, 2019

(54) ON-OFF VALVE DEVICE AND ROTARY MACHINE

(71) Applicant: MITSUBISHI HEAVY INDUSTRIES ENGINE & TURBOCHARGER, LTD., Kanagawa (JP)

(72) Inventor: Hirotaka Higashimori, Nagasaki (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 241 days.

(21) Appl. No.: 15/506,637

(22) PCT Filed: Feb. 23, 2015

(86) PCT No.: PCT/JP2015/055095
§ 371 (c)(1),
(2) Date: Feb. 24, 2017

(87) PCT Pub. No.: WO2016/031268
PCT Pub. Date: Mar. 3, 2016

(65) Prior Publication Data
US 2017/0254214 A1     Sep. 7, 2017

(30) Foreign Application Priority Data
Aug. 27, 2014   (WO) .................. PCT/JP2014/072460

(51) Int. Cl.
*F01B 25/02*    (2006.01)
*F01D 17/14*    (2006.01)
(Continued)

(52) U.S. Cl.
CPC ............. *F01D 17/145* (2013.01); *F01D 5/04* (2013.01); *F01D 5/12* (2013.01); *F01D 9/026* (2013.01);
(Continued)

(58) Field of Classification Search
CPC .......... F01D 17/00; F01D 17/12; F01D 17/14; F01D 17/143
(Continued)

(56) References Cited

U.S. PATENT DOCUMENTS

| 4,565,068 A | 1/1986 | Schneider |
| 4,579,506 A | 4/1986 | Ossberger et al. |

(Continued)

FOREIGN PATENT DOCUMENTS

| DE | 4210048 A1 | 9/1993 |
| DE | 29502676 U1 | 3/1995 |

(Continued)

OTHER PUBLICATIONS

International Search Report and Written Opinion of the International Searching Authority (Forms PCT/ISA/237 and PCT/ISA/210), dated Mar. 17, 2015, for International Application No. PCT/JP2015/055095 with an English translation.

(Continued)

*Primary Examiner* — John Kwon
(74) *Attorney, Agent, or Firm* — Birch, Stewart, Kolasch & Birch, LLP

(57) ABSTRACT

A turbocharger is provided with a valve body which is disposed in a suction flow path (Cb) leading from an inflow port of a housing covering a turbine rotor blade to a scroll flow path (Ca) and composed of a single piece or multiple divided pieces to supply a fluid (G) to the turbine rotor blade with the inner surface thereof formed using a first wall surface and a second wall surface facing the first wall surface as part thereof, extends from the upstream side to the downstream side of the flow of the fluid (G), is rotatably provided in the housing in a direction toward and away from the first wall surface and the second wall surface, forms an upstream-side narrowed flow path (F1) with the first wall (Continued)

surface therebetween at an end on the upstream side, and forms a downstream-side narrowed flow path (F2) with the second wall surface therebetween at an end on the downstream side. The valve body has a first surface at the end on the upstream side, which faces the first wall surface, gradually approaches the first wall surface from the upstream side to the downstream side and thereafter gradually goes away therefrom, and a second surface which faces the second wall surface.

8 Claims, 22 Drawing Sheets

(51) Int. Cl.
| | |
|---|---|
| *F01D 5/04* | (2006.01) |
| *F01D 25/24* | (2006.01) |
| *F01D 9/02* | (2006.01) |
| *F02B 37/22* | (2006.01) |
| *F01D 17/10* | (2006.01) |
| *F02B 37/02* | (2006.01) |
| *F01D 5/12* | (2006.01) |
| *F01D 17/18* | (2006.01) |
| *F01D 5/14* | (2006.01) |

(52) U.S. Cl.
CPC ........... *F01D 17/105* (2013.01); *F01D 17/14* (2013.01); *F01D 17/146* (2013.01); *F01D 17/148* (2013.01); *F01D 17/18* (2013.01); *F01D 25/24* (2013.01); *F02B 37/025* (2013.01); *F02B 37/22* (2013.01); *F01D 5/145* (2013.01); *F05D 2220/40* (2013.01); *F05D 2240/60* (2013.01); *F05D 2250/15* (2013.01); *Y02T 10/144* (2013.01)

(58) Field of Classification Search
USPC ....... 415/148, 150, 151, 158, 159, 160, 162, 415/163, 204, 205, 207, 208.1, 208.2
See application file for complete search history.

(56) References Cited

U.S. PATENT DOCUMENTS

| | | | | |
|---|---|---|---|---|
| 7,428,814 | B2* | 9/2008 | Pedersen | F01D 9/026 415/202 |
| 2005/0260067 | A1* | 11/2005 | Parker | F01D 17/165 415/160 |
| 2009/0290980 | A1* | 11/2009 | Higashimori | F01D 17/148 415/205 |
| 2010/0074743 | A1* | 3/2010 | Jairazbhoy | F03D 3/04 415/208.1 |
| 2012/0014788 | A1* | 1/2012 | Blair | F04D 29/444 415/208.2 |
| 2012/0294711 | A1* | 11/2012 | Grigoriev | F04D 29/444 415/204 |
| 2013/0149129 | A1* | 6/2013 | Matsuyama | F01D 25/24 415/208.1 |
| 2013/0177403 | A1* | 7/2013 | Olmstead | F01D 17/16 415/159 |
| 2014/0341729 | A1* | 11/2014 | Osako | F01D 17/165 415/208.1 |

FOREIGN PATENT DOCUMENTS

| | | |
|---|---|---|
| DE | 10041806 A1 | 3/2001 |
| DE | 102007025437 A1 | 12/2008 |
| DE | 102009020591 A1 | 11/2010 |
| DE | 102012110634 A1 | 5/2014 |
| EP | 0 208 248 A1 | 1/1987 |
| EP | 2402578 A1 | 1/2012 |
| JP | 54-47916 A | 4/1979 |
| JP | 60-19918 A | 2/1985 |
| JP | 62-193137 U | 12/1987 |
| JP | 63-48928 U | 4/1988 |
| JP | 63-306233 A | 12/1988 |
| JP | 1-21145 Y2 | 6/1989 |
| JP | 1-277627 A | 11/1989 |
| JP | 7-279680 A | 10/1995 |
| JP | 2000-110572 A | 4/2000 |
| JP | 3725287 B2 | 12/2005 |
| JP | 2007-23893 A | 2/2007 |
| JP | 2007-23894 A | 2/2007 |
| JP | 2007-192128 A | 8/2007 |
| JP | 2007-309140 A | 11/2007 |
| JP | 2008-503685 A | 2/2008 |
| JP | 2009-47163 A | 3/2009 |
| JP | 2012-102745 A | 5/2012 |
| WO | WO 2014/099329 A1 | 6/2014 |

OTHER PUBLICATIONS

International Search Report and Written Opinion of the International Searching Authority (Forms PCT/ISA/237 and PCT/ISA/210), dated Nov. 25, 2014, for International Application No. PCT/JP2014/072460 with an English translation.

* cited by examiner

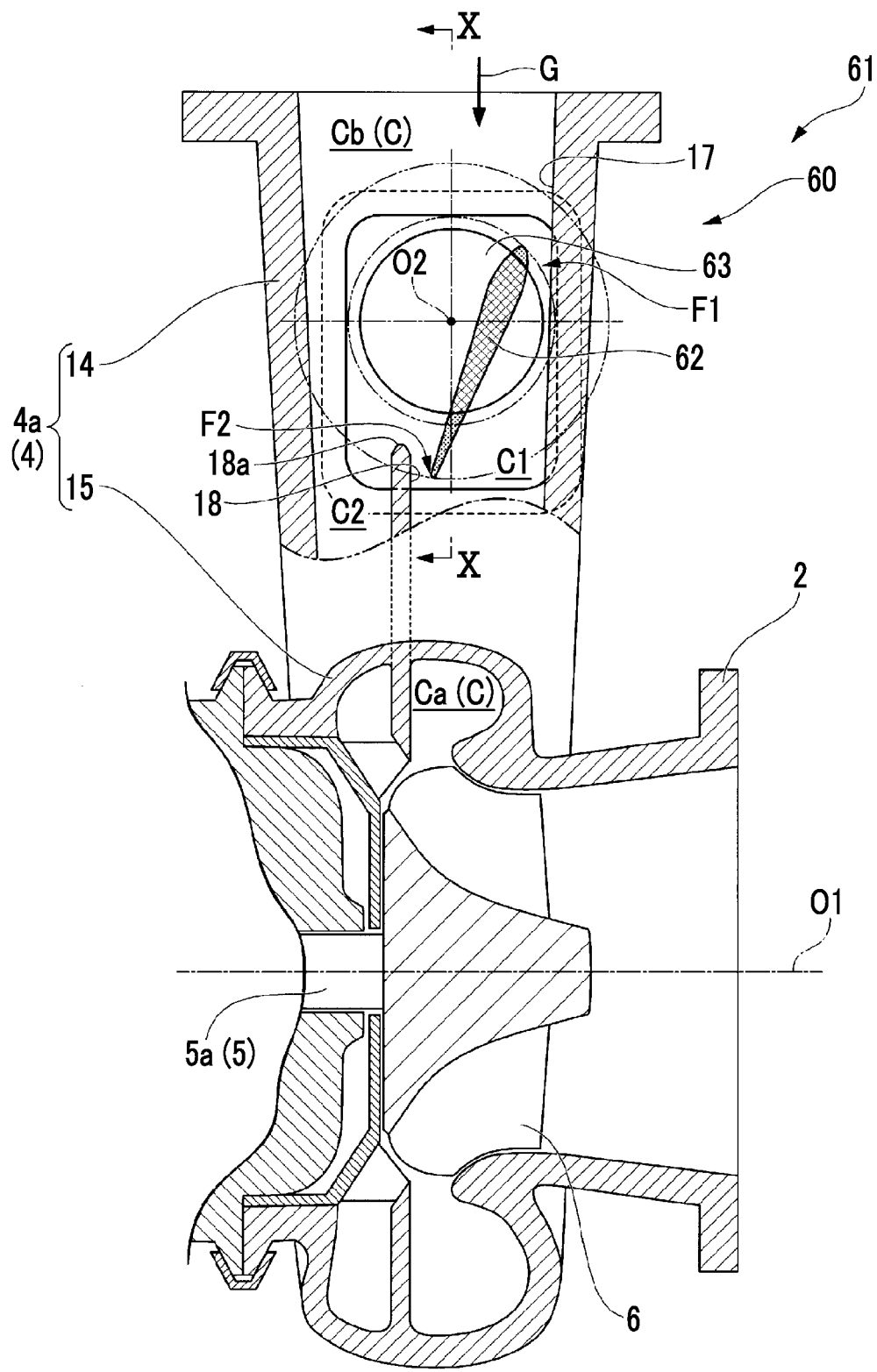

ON-OFF VALVE DEVICE AND ROTARY MACHINE

TECHNICAL FIELD

The present invention relates to an on-off valve device which is provided in a rotary machine and regulates a flow rate of a working fluid, and a rotary machine including the on-off valve.

BACKGROUND ART

For example, a rotary machine capable of extracting mechanical energy from kinetic energy of a fluid is known.

As the rotary machine, a turbocharger, an expander, a gas turbine, or the like is known, and a radial turbine, a mixed flow turbine, or the like is provided in these.

In general, as the turbocharger, a variable capacity turbine is used, which has a function which regulates a flow rate of an exhaust gas serving as a working fluid according to a change of output of an engine.

In addition, in a case where an expander is used in an apparatus which converts exhaust energy into electric energy, it is necessary to change output while maintaining a constant rotating speed in order to maintain a constant generation frequency. The expander has the above-described variable capacity function in order to cope with the above-described circumstances.

In addition, since a gas turbine used in a jet engine or the like is provided to accelerate or decelerate an aircraft, the gas turbine also has the variable capacity function.

Meanwhile, in order to realize the variable capacity function of the turbocharger, currently, various technologies are known. For example, there is a technology (for example, PTL1) which changes a throat area by regulating an attachment angle of a nozzle, a technology which uses a flow regulating valve or a bypass valve, or the like.

Here, FIG. 21 shows a turbine having a variable capacity function which uses a nozzle in the related art. In order to exert the variable capacity function, a turbine 200 includes a scroll flow path C0$a$, and an on-off valve 201 which is provided on an upstream end of a division wall 202 of a suction flow path C0$b$ and regulates a flow rate of a working fluid F0 flowing in a turbine rotor blade 203 by rotating the on-off valve 201 with the upstream end as a supporting point.

CITATION LIST

Patent Literature

[PTL 1] Japanese Unexamined Patent Application Publication No. 2012-102745

SUMMARY OF INVENTION

Technical Problem

However, in the configuration shown in FIG. 21 which is the above-described related art, if the angle of the on-off valve in the flow direction of the working fluid increases, the working fluid is separated on the downstream side due to diffuser effects, a backward flow is generated (refer to a speed distribution shown by a broken line in FIG. 21). Accordingly, a pressure loss increases, and operation efficiency of the turbine is likely to decrease.

Particularly, since the on-off valve is exposed to a high-temperature gas of approximately 1000° C. in a turbocharger or a small-sized gas turbine, it is necessary to avoid occurrence of thermal stress, thermal deformation, wear, or the like in a drive mechanism of the on-off valve. Accordingly, it is necessary to provide a mechanism for protecting the drive mechanism or secure a clearance between the on-off valve and a housing. In addition, operation efficiency is likely to decrease due to a flow leaking from the protection mechanism or the clearance.

The present invention provides an on-off valve device capable of improving operation efficiency by a simple structure and a rotary machine including the on-off valve device.

Solution to Problem

According to a first aspect of the present invention, there is provided an on-off valve device including: a valve body which is disposed in a suction flow path which leads from an inflow port of a housing covering a turbine rotor blade to a scroll flow path which is spirally formed and has a flow path area gradually decreased toward the downstream side of a flow of a fluid and is configured of a single piece or multiple divided pieces to supply a fluid to the turbine rotor blade with an inner surface of the suction flow path formed using a first wall surface and a second wall surface facing the first wall surface as a portion of the suction flow path, extends from the upstream side toward the downstream side of the flow of the fluid, is rotatably provided in the housing in a direction toward and away from the first wall surface and the second wall surface, forms an upstream-side narrowed flow path between the first wall surface and the valve body at an end on the upstream side, and forms a downstream-side narrowed flow path between the second wall surface and the valve body at an end on the downstream side. In the valve body, the end on the upstream side is an end facing the first wall surface, and the end on the upstream side is formed of a first surface which gradually goes away from the first wall surface after gradually approaches the first wall surface from the upstream side toward the downstream side, and the valve body includes a second surface which faces the second wall surface at the end on the downstream side.

According to the on-off valve device, it is possible to regulate a gap between the valve body and the first wall surface of the housing, that is, the flow path width of the upstream-side narrowed flow path by rotating the valve body, and it is possible to change the flow rate of the fluid flowing into the turbine rotor blade.

In addition, in the upstream-side narrowed flow path, the flow path width gradually decreases according to the shape of the first surface of the valve body, and thereafter, the flow path width gradually increases. Accordingly, the pressure of the fluid is recovered by diffuser effects while the fluid passing through the upstream-side narrowed flow path is prevented from being separated from the first surface.

In addition, the fluid passing through the downstream-side narrowed flow path is accelerated, a static pressure around the downstream-side narrowed flow path decreases. Therefore, the fluid which flows in the flow path between the first wall surface and the valve body is accelerated toward the static pressure decrease region which is formed by the downstream-side narrowed flow path. Accordingly, it is possible to prevent the fluid from being separated from the first surface. That is, since speeds of a fluid on the downstream side of the valve body are distributed so as to be uniformed, it is possible to decrease a pressure loss, and it is possible to prevent the entire pressure from decreasing.

In addition, in the on-off valve device according to a second aspect of the present invention, in the first aspect, an upstream-side opening which is open to the second surface, a downstream-side opening which is open to the first surface on the downstream side of the upstream-side opening, and a through hole portion which connects the upstream-side opening and the downstream-side opening to each other and penetrates a portion between the first surface and the second surface may be formed in the valve body.

In this way, since the through hole portion is formed in the valve body, a fluid flows from the upstream-side opening into the through hole portion and flows out from the downstream-side opening. As a result, since a flow velocity of the fluid around the outlet of the downstream-side opening increases and a static pressure decreases, it is possible to accelerate the fluid flowing along the first surface toward the downstream side. Accordingly, since speeds of the fluid on the downstream side of the valve body are distributed so as to be uniformed, it is possible to decrease a pressure loss, and it is possible to further prevent the entire pressure from decreasing.

Moreover, in the on-off valve device according to a third aspect of the present invention, in the first or the second aspect, the valve body may include a protrusion surface which gradually approaches the first wall surface toward the downstream side, a first recessed surface which is continued to the downstream side of the protrusion surface and is curved to be recessed toward the second surface, and a second recessed surface which is continued to the downstream side of the first recessed surface and is curved to be recessed toward the second surface with a curvature radius which is greater than that of the first recessed surface, as the first surface, and includes a protrusion surface which is cured to protrude toward the side going away from the first surface, as the second surface.

In this way, after the fluid passing through the upstream-side narrowed flow path flows along the protrusion surface, the fluid flows toward the downstream side along the first recessed surface and the second recessed surface. At this time, first, it is possible to cause the fluid to flow while increasing an increase rate of the flow path width between the first wall surface and the first recessed surface by the first recessed surface. Thereafter, it is possible to cause the fluid to flow while decreasing the increase rate of the flow path width by the second recessed surface. That is, by providing the second recessed surface having a greater curvature radius on the downstream side on which a flow velocity increases and boundary layer is easily generated, it is possible to effectively prevent the fluid from being separated from the first surface.

In addition, by providing the protrusion surface on the second wall surface side as the second surface, after a decrease rate of the flow path width between the second wall surface and the protrusion surface rapidly increases on the upstream side, the decrease rate of the flow path width gradually decreases. That is, the fluid flowing along the second surface is accelerated toward the downstream-side narrowed flow path, and the static pressure around the downstream-side narrowed flow path decreases. Accordingly, the fluid passing through the flow path between the first wall surface and the valve body is accelerated toward a static pressure decrease region which is formed by the downstream-side narrowed flow path, and it is possible to prevent the fluid from being separated from the first surface.

Therefore, it is possible to decrease a pressure loss, and it is possible to prevent it is possible to prevent the entire pressure from decreasing.

In the on-off valve device according to a fourth embodiment of the present invention, in the first or the second aspect, the valve body may include a first portion which is positioned on the upstream side and extends toward the downstream side, and a second portion which is formed to be smoothly continued to the downstream side of the first portion, is positioned to be closer to the second wall surface side than the first portion, and extends toward the downstream side in the extension direction of the first portion, and a protrusion surface which gradually approaches the first wall surface toward the downstream side and a recessed surface which is continued to the downstream side of the protrusion surface and is curved to be recessed toward the second surface may be formed over the first portion and the second portion as the first surface.

In this way, since the valve body includes the first portion and the second portion, the shape of the valve body is a shape which is bent or curved between the first portion and the second portion. Accordingly, by providing the valve body having the shape in the turbocharger, on the first wall surface side, after the fluid is guided to the downstream side by the protrusion surface of the first surface, the fluid is further guided to the downstream side by the recessed surface of the first surface and passes through a downstream-side enlargement flow path which is formed on the downstream side of the upstream-side narrowed flow path. Accordingly, on the first wall surface side of the valve body, when the flow path area is enlarged toward the downstream side, an area enlargement ratio increases on the upstream side, and the area enlargement ratio decreases on the downstream side. Accordingly, the decrease rate of the speed of the fluid passing through the upstream-side narrowed flow path decreases from the upstream side toward the downstream side. Accordingly, it is possible to prevent the speed of the fluid from being rapidly decreased, and it is possible to decrease a pressure loss.

Moreover, if the valve body is provided along the center axis of the first portion at the center axis of the suction flow path in the width direction, the fluid reaching the scroll flow path from the suction flow path flows to be parallel to the center axis of the suction flow path in the width direction. Accordingly, the fluid can reach winding starting of the scroll flow path (ending of the suction flow path) while the speed of the fluid is smoothly decreased, and it is possible to cause the fluid to effectively flow into the scroll flow path.

Moreover, in the valve body, the second portion is positioned to be close to the second wall surface side. Accordingly, even when an opening degree of the valve body is changed and an incidence angle (inflow angle) of the fluid at the end on the upstream side (leading edge) is suppressed so as to be small, it is possible to decrease the flow path area of the downstream-side narrowed flow path, and it is possible to increase flow velocity of the fluid passing through the downstream-side narrowed flow path. Meanwhile, as described above, since the enlargement ratio of the flow path area decreases on the downstream side of the upstream-side narrowed flow path between the first wall surface and the valve body, it is possible to prevent the fluid from being separated from the first surface. Accordingly, problems do not occur even when the incidence angle at the leading edge is small, and it is possible to further decrease the pressure loss of the fluid.

Moreover, in the on-off valve device according to a fifth aspect of the present invention, in any one of the first to fourth aspects, a rotary portion which rotates the valve body may be separately provided from the housing.

In this way, since the rotary portion is separately provided, it is possible to separately process the rotary portion using a process different from the process of manufacturing the housing, and it is possible to improve processing accuracy. Accordingly, it is possible to perform accurate processing by which a clearance between the first wall surface and the valve body and a clearance between the second wall surface and the valve body can be decreased as much as possible, and it is possible to prevent operation efficiency from decreasing due to a leakage flow from the clearances.

In addition, it is possible to easily improve processing accuracy of the attachment portion between the rotary portion and the valve body, it is possible to improve durability of the attachment portion, and it is possible to improve reliability of the on-off valve device.

In addition, in the on-off valve device according to a sixth aspect of the present invention, in any one of the first to fifth aspects, multiple valve bodies may be provided to be arranged in a row from the upstream side toward the downstream side, and rotary portions which individually rotate the valve bodies may be provided.

In this way, since the multiple valve bodies are provided and each valve body is rotated, it is possible to form the upstream-side narrowed flow path between the valve body positioned on the most upstream side and the first wall surface, and it is possible to form the downstream-side narrowed flow path between the valve body positioned on the most downstream side and the second wall surface. In addition, since each of the valve bodies is rotated, it is possible to arbitrarily change the flow path width of each of the upstream-side narrowed flow path and the downstream-side narrowed flow path. Moreover, since each of the valve bodies is rotated, it is possible to cause the fluid to flow from the upstream side toward the downstream side between the valve bodies. That is, the fluid flows between the valve bodies and flows to the first surface side of the valve body. As a result, a static pressure decreases at the position at which the fluid flows out. Accordingly, it is possible to accelerate the fluid flowing along the first surface toward the downstream side. Therefore, since speeds of the fluid on the downstream side of the valve body positioned on the downstream side are distributed so as to be uniformed, it is possible to decrease a pressure loss, and it is possible to prevent the entire pressure from decreasing.

In addition, by selecting a rotation angle of each valve body, the entirety of the multiple valve bodies arranged in a row has a shape protruding toward the second wall surface or has a shape protruding toward the first wall surface, and it is possible to select the valve body having an arbitrary shape. Accordingly, it possible to effectively prevent separation or the like by rotating each valve body according to the situation of the flow field of the fluid.

In the on-off valve device according to a seventh aspect of the present invention, in any one of the first to sixth aspects, the on-off valve device may further include multiple guide portions which are disposed in the scroll flow path to go away from each other in a circumferential direction of a rotary shaft of the turbine rotor blade on the outside in a radial direction of the rotary shaft of the turbine rotor blade from the turbine rotor blade, and includes guide surfaces facing the inside in the radial direction, and the guide surface in the guide portion positioned on the upstream side in the flow of the fluid may be provided so as to guide the fluid toward the guide surface in the guide portion positioned on the downstream side.

If the opening degree of the valve body decreases and the area of the downstream-side narrowed flow path decreases, a flow velocity distribution in which the flow velocity of the fluid passing through the downstream-side narrowed flow path increases is generated. The scroll flow path is formed in a spiral shape, and the fluid having the high-speed flow due to the fluid passing through the downstream-side narrowed flow path linearly flows due to the inertial force of the fluid, and flows as to be directed to the outside in the radial direction toward the wall portion of the scroll flow path. Here, the direction of the high-speed flow is changed so as to be directed in the circumferential direction by the guide surface of the guide portion disposed on the most upstream side by providing the multiple guide portions. In addition, it is possible to sequentially guide the high-speed flow to the guide surfaces of the guide portions on the downstream side. Accordingly, since it is possible to guide the high-speed flow in the circumferential direction and it is possible to introduce the high-speed flow into the turbine rotor blade, it is possible to improve operation efficiency. In addition, effects by which the flow path area of the scroll flow path is decreased can be obtained by the multiple guide portions. Accordingly, it is possible to increase efficiency as a variable capacity turbine having the scroll flow path in which the flow path area is variable.

In the on-off valve device according to an eighth aspect of the present invention, in the seventh aspect, each guide portion may be formed in a plate shape extending in the circumferential direction, the guide surface may be formed in a curved surface shape in the circumferential direction, and among the guide portions adjacent to each other in the circumferential direction, the guide surface at a trailing edge which becomes the end on the downstream side in the guide portion on the upstream side may be disposed such that an extension line of a tangential line in a cross section orthogonal to the rotary shaft in the guide surface passes through the guide surface in the guide portion on the downstream side.

In this way, since the guide portions are provided, it is possible to sequentially introduce the fluid to the guide portions on the downstream side by guiding the fluid to cause the fluid to come into contact with the guide surfaces of the guide portions on the downstream side. Accordingly, since it is possible to guide the high-speed flow in the circumferential direction and it is possible to introduce the high-speed flow to the turbine rotor blade, it is possible to further improve the operation efficiency.

In the on-off valve device according to a ninth aspect of the present invention, in the seventh or eighth aspect, after a thickness dimension of each guide portion gradually increases in the radial direction from a leading edge which becomes the end on the upstream side to a trailing edge which becomes the end on the downstream side, the thickness dimension may decrease, and each guide portion may be formed in a blade shape when viewed in an extension direction of the rotary shaft of the turbine rotor blade.

In this way, since the cross section of the guide portion is formed in a blade shape, it is possible to smoothly guide the fluid in the circumferential direction of the rotary shaft while decreasing a friction loss of the fluid generated due to the guide surface, and it is possible to further improve the operation efficiency.

In the on-off valve device according to a tenth aspect of the present invention, in any one of the seventh to ninth aspects, the scroll flow path may be formed in a shape in which a flow path area of the scroll flow path decreases in a flow direction of the fluid, each guide portion may be formed in a plate shape extending in the circumferential direction, and among the guide portions adjacent to each other in the circumferential direction, the leading edge which becomes the end on the upstream side in the guide portion positioned on the downstream side may be positioned on the inside in the radial direction of the leading edge in the guide portion positioned on the upstream side.

The flow path area of the scroll flow path decreases from the upstream side toward the downstream side. Here, if a new guide portion is provided in the scroll flow path in the related art, since the guide portion occupies a portion of the region of the flow path cross section, a block-cage occurs. Particularly, the flow path sectional area on the downstream side of the scroll flow path is smaller than the flow path sectional area on the upstream portion, and if the guide portion which is the same as that on the upstream side of the scroll flow path is installed, a ratio of the sectional area of the guide portion which occupies the scroll sectional area increases. Accordingly, a so-called wake (back flow G1) is generated on the downstream side, and a loss occurs. However, since the positions of the leading edges of the multiple guide portions are disposed to be gradually closer to the inside in the radial direction toward the downstream side, it is possible to decrease a pressure loss generated due to the block-cage. Accordingly, it is possible to introduce the flow of the fluid passing through the downstream-side narrowed flow path in the circumferential direction according to the shape of the scroll flow path without increasing a loss.

In the on-off valve device according to an eleventh aspect of the present invention, in any one of the seventh to tenth aspects, the scroll flow path may be formed in a shape in which the flow path area of the scroll flow path decreases in the flow direction of the fluid, each guide portion may be formed in a plate shape extending in the circumferential direction, and among the guide portions adjacent to each other in the circumferential direction, the trailing edge which becomes the end on the downstream side in the guide portion positioned on the downstream side may be positioned on the inside in the radial direction of the trailing edge in the guide portion positioned on the upstream side.

The flow path area of the scroll flow path decreases from the upstream side toward the downstream side. Here, if a new guide portion is provided in the scroll flow path in the related art, the above-described blockage occurs, a so-called wake (back flow) is generated on the downstream side, and a loss occurs. Here, by disposing the positions of the trailing edges of the multiple guide portions to be gradually closer to the inside in the radial direction toward the downstream side, it is possible to decrease a pressure loss generated due to the block-cage. Accordingly, it is possible to introduce the flow of the fluid passing through the downstream-side narrowed flow path in the circumferential direction according to the shape of the scroll flow path without increasing a loss.

In the on-off valve device according to a twelfth aspect of the present invention, in any one of the seventh to eleventh aspects, the scroll flow path may be formed in a shape in which the flow path area of the scroll flow path decreases in the flow direction of the fluid, each guide portion may be formed in a plate shape extending in the circumferential direction, and among the guide portions adjacent to each other in the circumferential direction, a dimension in a longitudinal direction along the circumferential direction of the guide portion positioned on the downstream side may decrease.

The flow path area of the scroll flow path decreases toward the downstream side. Accordingly, since the thickness dimension of the guide portion gradually decreases toward the downstream side, it is possible to prevent a volume ratio of the guide portion occupying the inside of the suction flow path from increasing. As a result, it is possible to decrease the ratio of the back flow from the guide portion which occupies the inside of the suction flow path, it is possible to decrease a pressure loss generated due to the back flow, and it is possible to introduce the flow of the fluid passing through the downstream-side flow path in the circumferential direction according to the shape of the scroll flow path without increasing a loss. In addition, it is possible to decrease an exciting force of the turbine rotor blade generated by the back flow.

In the on-off valve device according to a thirteenth aspect of the present invention, in any one of the seventh to twelfth aspects, the housing may be formed to be divided in the extension direction of the rotary shaft of the turbine rotor blade, and the guide portion may be integrally formed with the divided one of the housing.

For example, in a case where the housing is formed by casting, if the housing is integrally formed so as to provide the suction flow path and the scroll flow path inside the housing, it is necessary to form the guide portion using a core. Here, since the housing is formed so as to be divided, it is possible to form the guide portion as a member erected on the divided one without using the core. Accordingly, it is possible to accurately form the guide portion. Moreover, it is possible to smoothly finish the guide surface of the guide portion. In addition, since it is possible to smoothly finish the inner surfaces of the suction flow path and the scroll flow path, it is possible to prevent an increase of a flow loss when the fluid flows through the suction flow path and the scroll flow path.

In addition, according to a fourteenth aspect of the present invention, there is provided a rotary machine, including: a rotary shaft which rotates about an axis; a turbine rotor blade which rotates along with the rotary shaft; a housing which covers the rotary shaft and the turbine rotor blade and in which a suction flow path and a scroll flow path through which a fluid is supplied to the turbine rotor blade are formed; and the on-off valve device according to any one of the first to thirteenth aspects which is provided in the housing such that the valve body is disposed in the suction flow path.

According to the rotary machine, since the on-off valve device is provided, in the upstream-side narrowed flow path, the flow path width gradually decreases according to the shape of the first surface of the valve body, and thereafter, the flow path width gradually increases. Accordingly, a pressure is recovered due to diffuser effects while the fluid passing through the upstream-side narrowed flow path is prevented from being separated from the first surface. In addition, if the fluid passes through the downstream-side narrowed flow path, since the fluid is accelerated, a static pressure around the downstream-side narrowed flow path decreases. Accordingly, the fluid passing through the flow path between the first wall surface and the valve body is accelerated toward the static pressure decrease region which is formed by the downstream-side narrowed flow path. Therefore, it is possible to prevent the fluid from being separated from the first surface, that is, speeds of a fluid on the downstream side of the valve body are distributed so as to be uniformed. As a result, it is possible to decrease a pressure loss, and it is possible to prevent the entire pressure from decreasing.

In addition, in the rotary machine according to a fifteenth aspect of the present invention, in the fourteenth aspect, in the housing, the second wall surface may be formed of a division wall surface which divides the scroll flow path into two paths in the direction intersecting the flow direction of the fluid.

In this way, in the rotary machine in which the scroll flow path is divided into two paths, since speeds of a fluid on the downstream side of the valve body are distributed so as to be uniformed, it is possible to decrease a pressure loss, and it is possible to prevent the entire pressure from decreasing.

According to a sixteenth aspect of the present invention, there is provided a rotary machine, including: a rotary shaft which rotates about an axis; a turbine rotor blade which rotates along with the rotary shaft; a housing which covers the rotary shaft and the turbine rotor blade and in which a suction flow path and a scroll flow path through which a fluid is supplied to the turbine rotor blade are formed; and multiple guide portions which are disposed in the scroll flow path to go away from each other in a circumferential direction of a rotary shaft of the turbine rotor blade on the outside in a radial direction of the rotary shaft of the turbine rotor blade from the turbine rotor blade, and includes guide surfaces facing the inside in the radial direction, in which the guide surface in the guide portion positioned on the upstream side in a flow of a fluid is provided so as to guide the fluid toward the guide surface in the guide portion positioned on the downstream side.

The fluid flowing from the inflow port is reflected on the wall surface (the inner surface of the suction flow path) of the scroll flow path, and a secondary flow directed to the inside in the radial direction may occur. Here, it is possible to introduce the fluid from the inlet portion in the circumferential direction in the scroll flow path without being directed to the wall surface of the scroll flow path by providing the guide portion. Accordingly, it is possible to prevent occurrence of the secondary flow. Therefore, it is possible to decrease a pressure loss by preventing the secondary flow, and it is possible to cause the fluid to uniformly flow when the fluid flows into the turbine rotor blade. As a result, the incidence angle (inflow angle) of the fluid to the turbine rotor blade is appropriately maintained, and it is possible to improve operation efficiency by decreasing an incidence loss. In addition, effects by which the flow path area of the scroll flow path is decreased can be obtained by the multiple guide portions. Accordingly, it is possible to increase efficiency as a variable capacity turbine having the scroll portion in which the flow path area is variable.

Advantageous Effects of Invention

According to the on-off valve device and the rotary machine, since the valve body which forms the upstream-side narrowed flow path and the downstream-side narrowed flow path and has the first surface is provided, it is possible to improve operation efficiency by a simple structure.

BRIEF DESCRIPTION OF DRAWINGS

FIG. 7A is a sectional view taken along a surface parallel to an axis of a rotary shaft showing a main portion of a turbocharger according to a fifth embodiment of the present invention.

DESCRIPTION OF EMBODIMENTS

[First Embodiment]

Hereinafter, a turbocharger 1 according to a first embodiment of the present invention will be described with reference the drawings.

Figure 1:
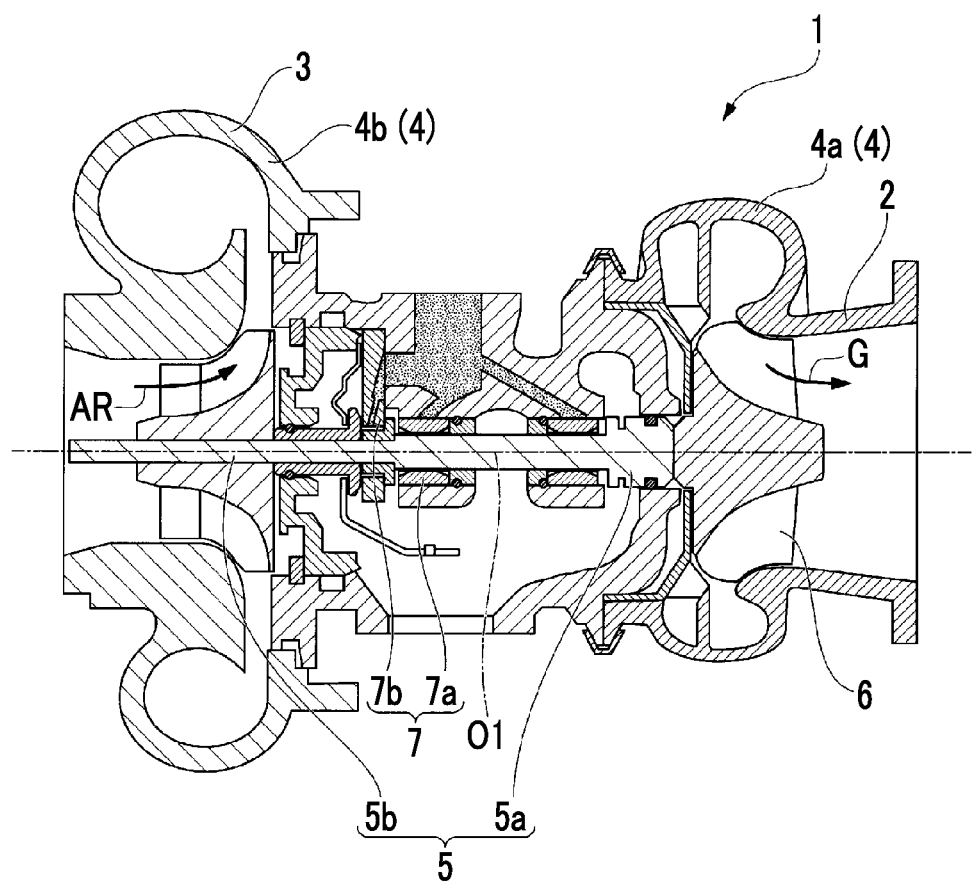
FIG. 1 is a sectional view including an axis of a rotary shaft showing the entire turbocharger according to a first embodiment of the present invention.

As shown in FIG. 1, the turbocharger 1 (rotary machine) includes a rotary shaft 5 which rotates about an axis O1, a turbine 2 and a compressor 3 which rotates along with the rotary shaft 5, a housing 4 which covers the rotary shaft 5, and a bearing device 7 which is provided in the housing 4 and supports the rotary shaft 5.

The bearing device 7 includes a radial bearing 7a which receives a load of the rotary shaft 5 in a radial direction and a thrust bearing 7b which receives a load of the rotary shaft 5 in a thrust direction.

The turbocharger 1 rotates the turbine 2 by an exhaust gas G (fluid) from an engine (not shown), and supplies air AR which is compressed by the compressor 3 according to the rotation to the engine.

Figure 2:
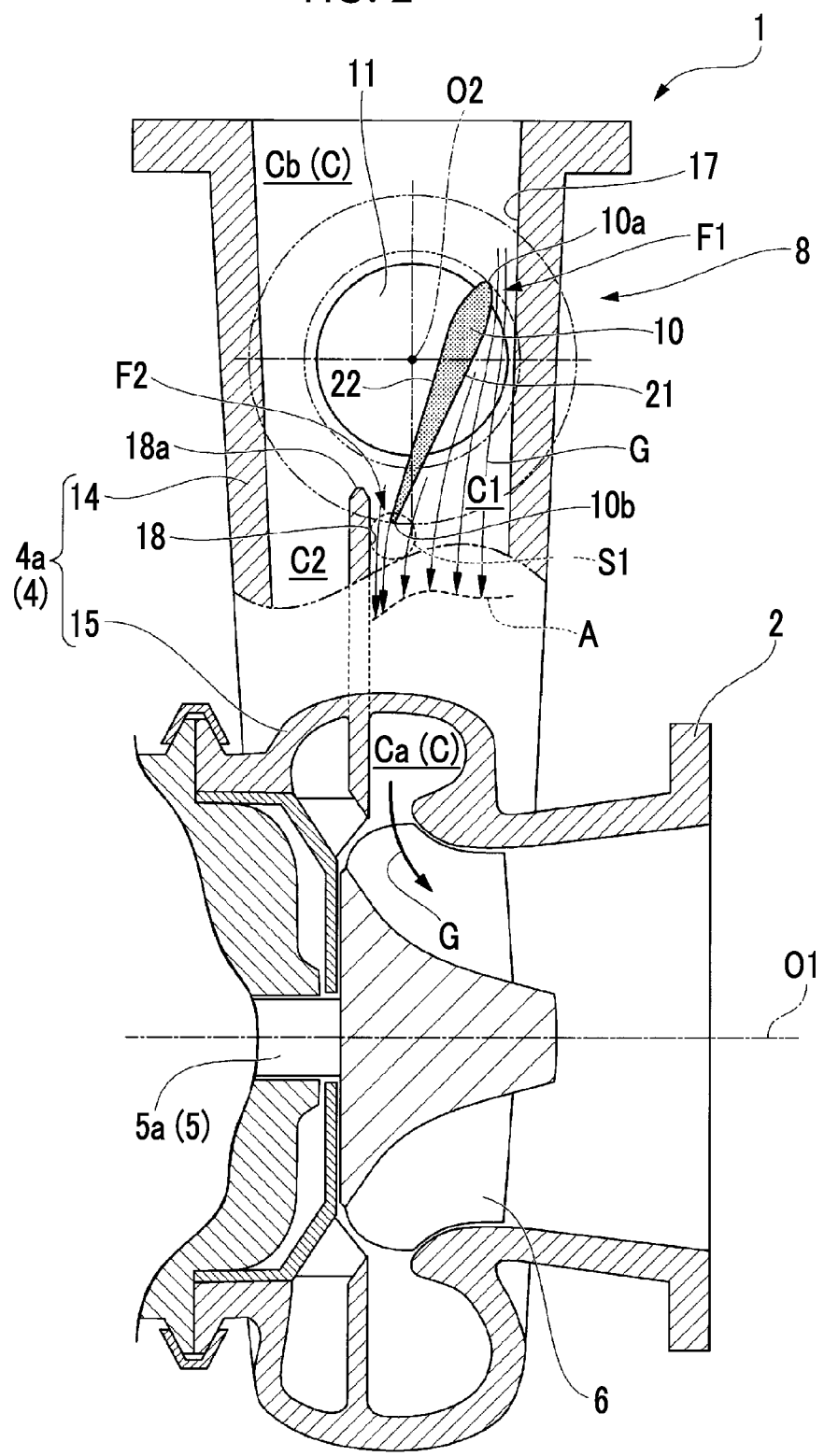
FIG. 2 is a sectional view taken along a surface parallel to the axis of the rotary shaft showing a main portion of the turbocharger according to the first embodiment of the present invention.

As shown in FIG. 2, the turbine 2 includes a turbine rotary shaft 5a, a turbine rotor blade 6 which is attached to the turbine rotary shaft 5a, a turbine housing 4a which covers the turbine rotor blade 6, and an on-off valve device 8 which is provided in the turbine housing 4a.

The turbine rotary shaft 5a is portion of the turbine 2 side in the rotary shaft 5. The turbine rotary shaft 5a is integrated with a compressor rotary shaft 5b of the compressor 3 side so as to configure the rotary shaft 5.

The turbine housing 4a is integrated with the compressor housing 4b covering the compressor 3 so as to configure the housing 4.

In addition, a flow path C through which the exhaust gas G flows into the turbine rotor blade 6 is formed in the turbine housing 4a.

The flow path C is formed inside an inlet portion 14 which is provided in the turbine housing 4a and in which an inflow port extending and opening toward the outside in the radial direction of the axis O1 is provided, and is formed inside a scroll portion 15 (a portion appearing as a spiral shape when the entire turbine housing 4a is viewed) which is provided in the turbine housing 4a so as to be continuous to the inlet portion 14 and spirally extends toward the turbine rotor blade 6 in the circumferential direction.

That is, the flow path C is configured of a scroll flow path Ca which is formed inside the scroll portion 15 and a suction flow path Cb which is formed inside the inlet portion 14.

In addition, a flow path area of the scroll flow path Ca gradually decreases toward the downstream side in the flow of the exhaust gas G.

In the inlet portion 14, a wall surface 17 (first wall surface) which forms the inner surface of the suction flow path Cb, and a division wall surface 18 (second wall surface) which is disposed to face the wall surface 17 in the direction of the axis O1 and extends from the inlet with respect to the turbine rotor blade 6 toward the outside in the radial direction. Accordingly, the suction flow path Cb (and the scroll flow path Ca) is divided into two in the direction of the axis O1. That is, the turbocharger 1 of the present embodiment is a so-called twin scroll turbo.

Hereinafter, the portion of the turbine rotor blade 6 side in the flow path C in the state where the division wall surface 18 is interposed is referred to as a first flow path C1, and the portion of the compressor 3 side is referred to as a second flow path C2.

The on-off valve device 8 includes a valve body 10 which is provided in the turbine housing 4a over the portion between the wall surface 17 and the division wall surface 18, and a rotary portion 11 which attaches the valve body 10 to the turbine housing 4a.

The valve body 10 is a member which extends from the upstream side in the flow of the exhaust gas G toward the downstream side, that is, extends in the radial direction of the rotary shaft 5. The valve body 10 includes a first surface 21 which faces the wall surface 17 side of the turbine housing 4a and a second surface 22 which faces the division wall surface 18 side, and is formed in a blade shape when viewed in the circumferential direction of the rotary shaft 5.

The valve body 10 is provided to form an upstream-side narrowed flow path F1 between the wall surface 17 and the valve body 10 on an end on the upstream side (an end (leading edge 10a) on the outside in the radial direction)) and to form a downstream-side narrowed flow path F2 between the division wall surface 18 and the valve body 10 on an end on the downstream side (in the inside in the radial direction (trailing edge 10b)). Each of the upstream-side narrowed flow path F1 and the downstream-side narrowed flow path F2 is a throttle portion in which a width of a flow path of the exhaust gas G decreases.

In addition, the end on the downstream side of the valve body 10 extends to a position at which the end overlaps a tip portion 18a of the division wall surface 18 in the radial direction of the rotary shaft 5. In other words, a distance between the end on the downstream side of the valve body 10 and the axis O1 of the rotary shaft 5 is shorter than a distance between the tip portion 18a and the axis O1 of the rotary shaft 5.

After the first surface 21 of the valve body 10 is smoothly curved toward the trailing edge 10b side to gradually approach the wall surface 17 on the leading edge 10a which becomes the position of the end on the upstream side, the first surface 21 is linearly formed so as to gradually go away from the wall surface 17 toward the downstream side. That is, the first surface 21 has a protrusion shape toward the wall surface 17 side in the direction of the axis O1.

The second surface 22 of the valve body 10 has the shape similar to that of the first surface 21. That is, the second surface 22 has a protrusion shape toward the division wall surface 18 side and is formed to linearly extend to the trailing edge 10b side.

That is, after the first surface 21 and the second surface 22 go away from each other toward the trailing edge 10b side, the first surface 21 and the second surface 22 approach each other. Accordingly, after the thickness of the valve body 10 in the direction of the axis O1 gradually increases from the leading edge 10a toward the trailing edge 10b side, the thickness of the valve body 10 gradually decreases, the thickness of the trailing edge 10b is smaller than the thickness of the leading edge 10a, and the valve body 10 has a tapered shape.

The valve body 10 provided on the turbine housing 4a at the inlet portion 14 is attached to the rotary portion 11. As shown in FIG. 2, the rotary portion 11 can rotate the valve body 10 in a direction toward and away from the wall surface 17 and the division wall surface 18, that is, can rotate the valve body 10 about an axis O2 extending in the circumferential direction of the rotary shaft 5. The rotary portion 11 rotates the valve body 10 at a predetermined angle by a controller (not shown).

In addition, in the rotary portion 11, the axis O2 which becomes the rotation center of the valve body 10 is positioned outside the valve body 10. That is, the rotation center of the valve body 10 is disposed to go away from the valve body 10 on the compressor 3 side in the direction of the axis O1 of the rotary shaft 5.

Next, the operation of the valve body 10 will be described with reference to FIGS. 3A to 3C.

Figure 3A:
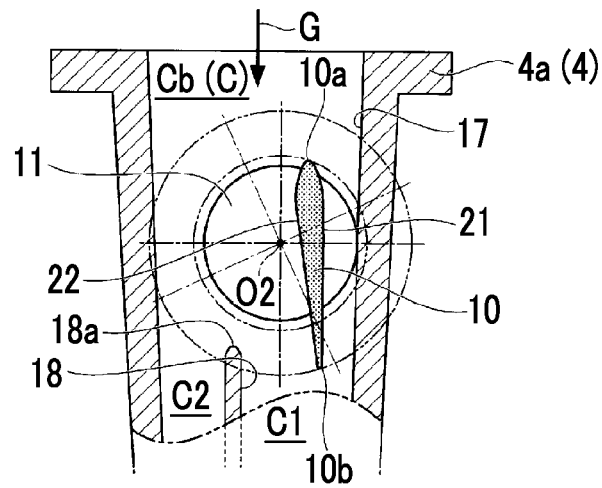
FIG. 3A is a sectional view taken along the surface parallel to the axis of the rotary shaft showing a main portion of the turbocharger according to the first embodiment of the present invention, and shows an on-off valve device when the valve device is fully opened.

Specifically, as shown in FIG. 3A, when the valve body 10 is fully opened, the leading edge 10a of the valve body 10 goes away from the wall surface 17 and the first surface 21 is disposed along the wall surface 17. In addition, the trailing edge 10b goes away from the division wall surface 18 and the second surface 22 is disposed along the division wall surface 18.

In the present embodiment, the valve body 10 is fully opened when the first surface 21 is approximately parallel to the wall surface 17, the flow rate of the exhaust gas G flowing into the turbine rotor blade 6 through the first flow path C1 becomes the maximum.

Figure 3B:
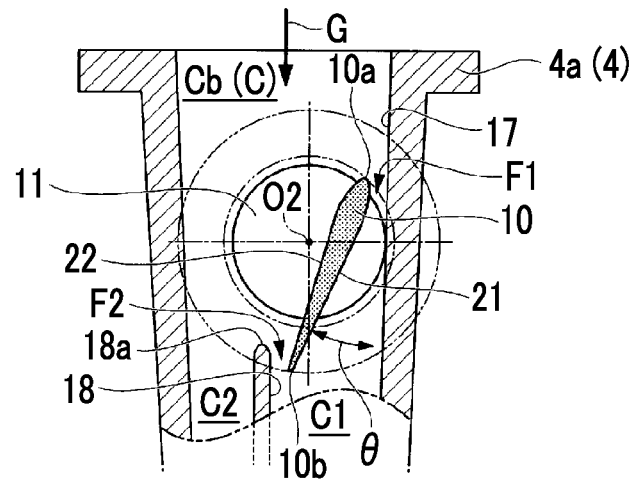
FIG. 3B is a sectional view taken along the surface parallel to the axis of the rotary shaft showing a main portion of the turbocharger according to the first embodiment of the present invention, and shows the on-off valve device having an intermediate opening degree.

In addition, as shown in FIG. 3B, in a case where the valve body 10 has an intermediate opening degree, the opening degree of the valve body 10 becomes an opening degree θ (an inclination angle of the trailing edge 10b of the valve body 10 in a direction from the wall surface 17 toward the division wall surface 18) from the state where the valve body 10 is fully opened, the leading edge 10a of the valve body 10 approaches the wall surface 17 and the trailing edge 10b approaches the division wall surface 18. At this time, a gap is formed between the leading edge 10a of the valve body 10 and the wall surface 17, and this gap becomes the upstream-side narrowed flow path F1. In addition, a gap is also formed between the trailing edge 10b and the division wall surface 18 and this becomes the downstream-side narrowed flow path F2.

Figure 3C:
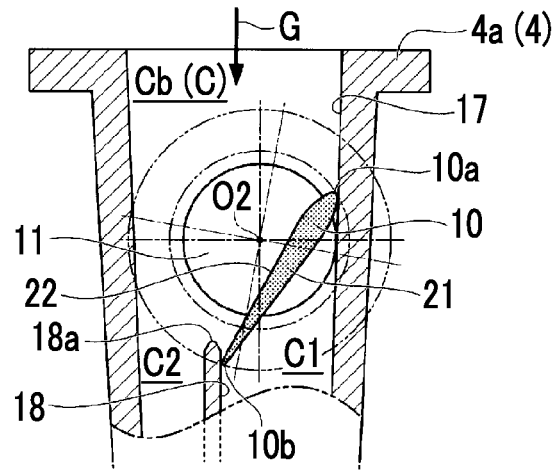
FIG. 3C is a sectional view taken along the surface parallel to the axis of the rotary shaft showing a main portion of the turbocharger according to the first embodiment of the present invention, and shows the on-off valve device when the valve device is fully closed.

In addition, as shown in FIG. 3C, when the valve body 10 is fully closed, the leading edge 10a of the valve body 10 comes into contact with the wall surface 17, the trailing edge 10b comes into contact with the tip portion of the division wall surface 18, and the first flow path C1 is closed.

Here, in actual, the case where the valve body 10 is fully closed does not include only the state where the valve body 10 completely comes into contact with the wall surface 17 and the division wall surface 18, and also includes a case where a slight gap is formed between the valve body 10, and the wall surface 17 and the division wall surface 18.

Meanwhile, it is possible to decrease a chord length (a length dimension from the leading edge 10a to the trailing edge 10b) of the valve body 10 by increasing the opening degree θ. In this case, a surface area of the valve body 10 which is exposed to the high temperature exhaust gas G decreases. Accordingly, preferably, the opening degree θ is 10° or more. In addition, more preferably, the opening degree θ is set to a range from 15° to 45°.

According to the turbocharger 1, by rotating the valve body 10 using the rotary portion 11, it is possible to regulate the flow path width of the upstream-side narrowed flow path F1, and it is possible to change the flow rate of the exhaust gas G flowing into the turbine rotor blade 6 through the first flow path C1 and the scroll flow path Ca.

In addition, in the case where the valve body 10 has the intermediate opening degree, in the shape of the upstream-side narrowed flow path F1, the flow path width gradually decreases according to the shape of the first surface 21 of the valve body 10, and thereafter, the flow path width gradually increases. Accordingly, a pressure is recovered due to diffuser effects while the exhaust gas G passing through the upstream-side narrowed flow path F1 is prevented from being separated from the first surface 21. In addition, if the exhaust gas G passes through the downstream-side narrowed flow path F2, since the exhaust gas G is accelerated, a static pressure around the downstream-side narrowed flow path F2 decreases. Accordingly, the exhaust gas G flowing between the first surface 21 and the wall surface 17 in the valve body 10 is accelerated toward the static pressure decrease region S1 (refer to FIG. 2) which is formed by the downstream-side narrowed flow path F2.

Accordingly, it is possible to prevent the exhaust gas G from being separated from the first surface 21. That is, as shown by a broken line in FIG. 2, since speeds of a fluid on the downstream side of the valve body 10 are distributed so as to be uniformed, it is possible to decrease a pressure loss, and it is possible to prevent the entire pressure in the first flow path C1 from decreasing.

According to the turbocharger 1 of the present embodiment, since the upstream-side narrowed flow path F1 and the downstream-side narrowed flow path F2 are formed and the valve body 10 having a blade shape is provided, it is possible to improve operation efficiency by a simple structure.

Here, in the present embodiment, the valve body 10 has a blade-shaped cross section. However, for example, the valve body 10 may have an elliptical cross section or a diamond-shaped cross section having the leading edge and the trailing edge with apexes. That is, any shape may be adopted as long as it gradually approaches the first surface from the leading edge toward the trailing edge side, and thereafter, it goes away from the first surface. Accordingly, the second surface may not necessarily have the shape which protrudes toward the division wall surface 18 side. For example, the second surface may be linearly formed when viewed in the circumferential direction.

[Second Embodiment]

Next, a turbocharger 31 according to a second embodiment of the present invention will be described with reference to FIG. 4.

In addition, the same reference numerals are assigned to the same components similar to those of the first embodiment, and detailed descriptions thereof are omitted.

In the present embodiment, a valve body 32 of an on-off valve device 30 is different from that of the first embodiment.

Similarly to the first embodiment, the valve body 32 has a blade-shaped cross section. In addition, in the valve body 32, an upstream-side opening 36 which is open to a second surface 34, a downstream-side opening 37 which is open to a first surface 33, and a through hole portion which connects the upstream-side opening 36 and the downstream-side opening 37 to each other and penetrates the valve body 32 are formed.

The upstream-side opening 36 is open to the second surface 34 so as to be spread such that the axis O2 which is the rotation center of the valve body 32 is interposed between both sides on the inside and the outside in the radial direction of the rotary shaft 5.

The downstream-side opening 37 is open to the first surface 33 at a position closer to the inside in the radial direction of the rotary shaft 5 than the axis O2. An opening area of the downstream-side opening 37 is smaller than an opening area of the upstream-side opening 36.

That is, with respect to a straight line which connects a leading edge 32a and a trailing edge 32b of the valve body 32 to each other, the upstream-side opening 36 is open to the second surface 34 so as to further approach the leading edge 32a than the downstream-side opening 37, and the downstream-side opening 37 is open to the first surface 33 so as to approach the trailing edge 32b.

A hole diameter of the through hole portion 38 gradually decreases from the upstream-side opening 36. In addition, in the inner surface of the through hole portion 38, an inner surface 38a positioned on the trailing edge 32b side of the valve body 32 is smoothly curved in an arc shape so as to protrude toward the leading edge 32a side and is connected to the downstream-side opening 37. In other words, the through hole portion 38 is formed in a bell-mouth shape in which the diameter of the through hole portion 38 increases toward the outside of the valve body 32 on the upstream-side opening 36 side.

Since the through hole portion 38 is formed in the valve body 32, the exhaust gas G flows from the upstream-side opening 36 into the through hole portion 38 and flows out from the downstream-side opening 37. At this time, sine the flow velocity of the exhaust gas G increases in the vicinity of the outlet of the downstream-side opening and a static pressure decreases, it is possible to accelerate the exhaust gas G flowing along the first surface 33 toward the downstream side.

Figure 4:
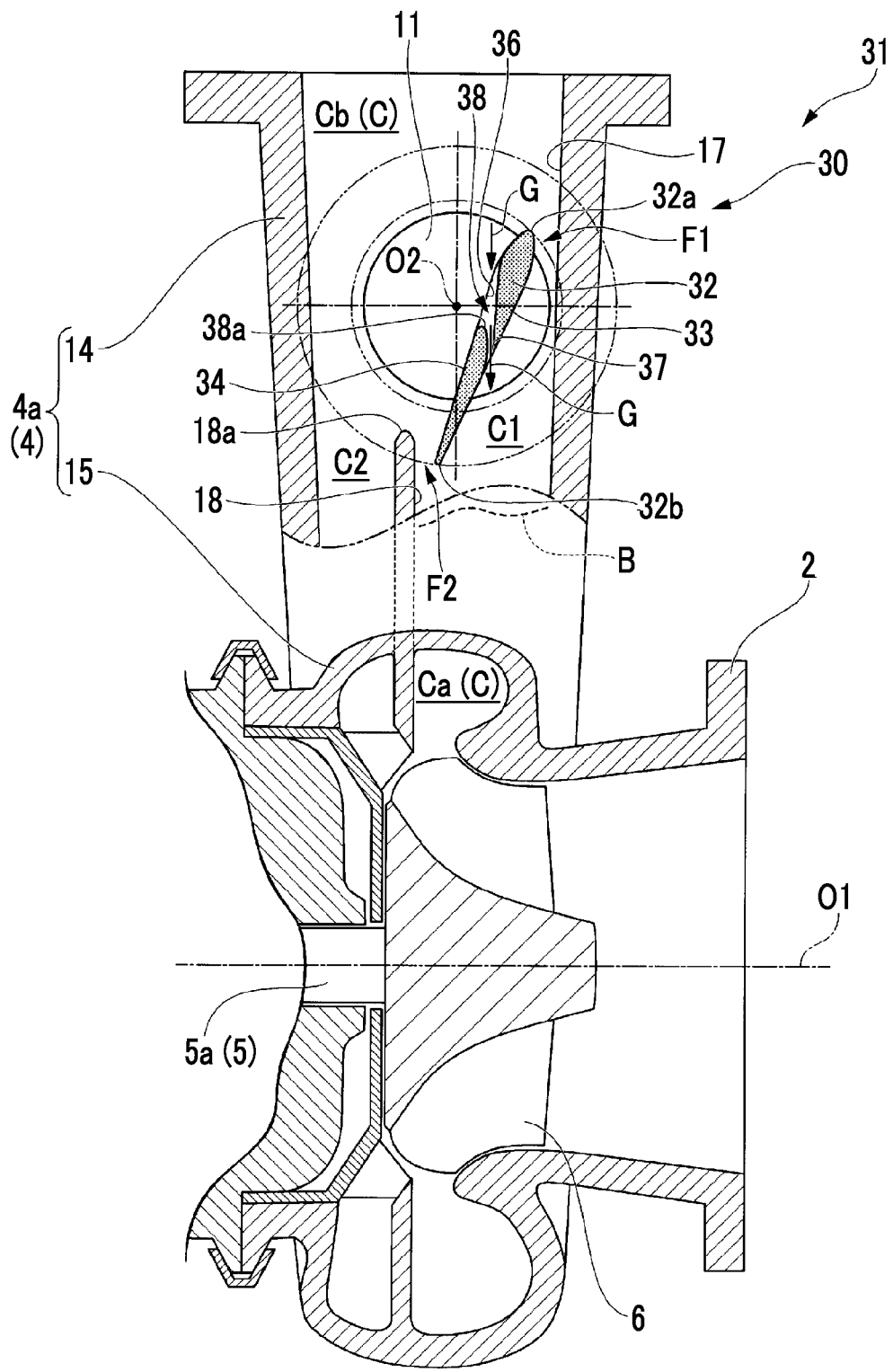
FIG. 4 is a sectional view taken along a surface parallel to an axis of a rotary shaft showing a main portion of a turbocharger according to a second embodiment of the present invention.

As a result, as shown by a broken line B in FIG. 4, since speeds of the exhaust gas G on the downstream side of the valve body 32 are distributed so as to be uniformed, it is possible to decrease a pressure loss, and it is possible to further prevent the entire pressure from decreasing. Accordingly, in the turbocharger 31 of the present embodiment, it is possible to further improve operation efficiency.

Here, multiple through hole portions 38 or only one through hole portion 38 may be formed so as to go away in the direction of the axis O2 which becomes the rotation center of the valve body 32. Similarly, multiple through hole portions 38 may be formed in the extension direction (the direction from the leading edge 32a toward the trailing edge 32b) of the valve body 32.

In addition, the shape of the through hole portion 38 is not necessarily limited to the case of the present embodiment. The upstream-side opening 36 side may not be formed of a bell-mouth shape. For example, the through hole portion 38 may be a simple hole portion in which the sectional area thereof is uniform from the upstream-side opening 36 to the downstream-side opening 37. In addition, the hole portion may have a circular cross section or a rectangular cross section.

[Third Embodiment]

Next, a turbocharger 41 according to a third embodiment of the present invention will be described with reference to FIG. 5.

In addition, the same reference numerals are assigned to the components similar to those of the first embodiment and the second embodiment, and detailed descriptions thereof are omitted.

In the present embodiment, a valve body 42 of an on-off valve device 40 is different from those of the first embodiment and the second embodiment.

The valve body 42 includes a protrusion surface 43a, a first recessed surface 43b, and a second recessed surface 43c which are continuous from the leading edge 42a to the trailing edge 42b, as the first surface 43. In addition, the valve body 42 includes a protrusion surface 44a as the second surface 44.

The protrusion surface 43a of the first surface 43 is formed on the leading edge 42a of the valve body 42, and approaches the wall surface 17 while being curved toward the trailing edge 42b side.

The first recessed surface 43b is smoothly continued to the protrusion surface 43a toward the trailing edge 42b side and is curved to be recessed toward the second surface 44 with a curvature radius R1.

The second recessed surface 43c is smoothly continued to the first recessed surface 43b toward the trailing edge 42b side and is curved toward the second surface 44 with a curvature radius R2 which is greater than that of the first recessed surface 43b.

The protrusion surface 44a of the second surface 44 extends from the leading edge 42a toward the trailing edge 42b side and is curved to protrude toward the side going away from the first surface 43.

According to the turbocharger 41 of the present embodiment, after the exhaust gas G passing through the upstream-side narrowed flow path F1 flows along the protrusion surface 43a, the exhaust gas flows toward the downstream side along the first recessed surface 43b and the second recessed surface 43c. At this time, first, it is possible to cause the exhaust gas G to flow while increasing an increase rate of the flow path width between the wall surface 17 and the valve body 42 due to the first recessed surface 43b having the smaller curvature radius R1.

Thereafter, it is possible to cause the exhaust gas G to flow while decreasing the increase rate of the flow path width due to the second recessed surface 43c. That is, by providing the second recessed surface 43c having a greater curvature radius R2 on the downstream side on which a boundary layer is easily generated, it is possible to effectively prevent the exhaust gas G from being separated from the first surface 43.

Figure 5:
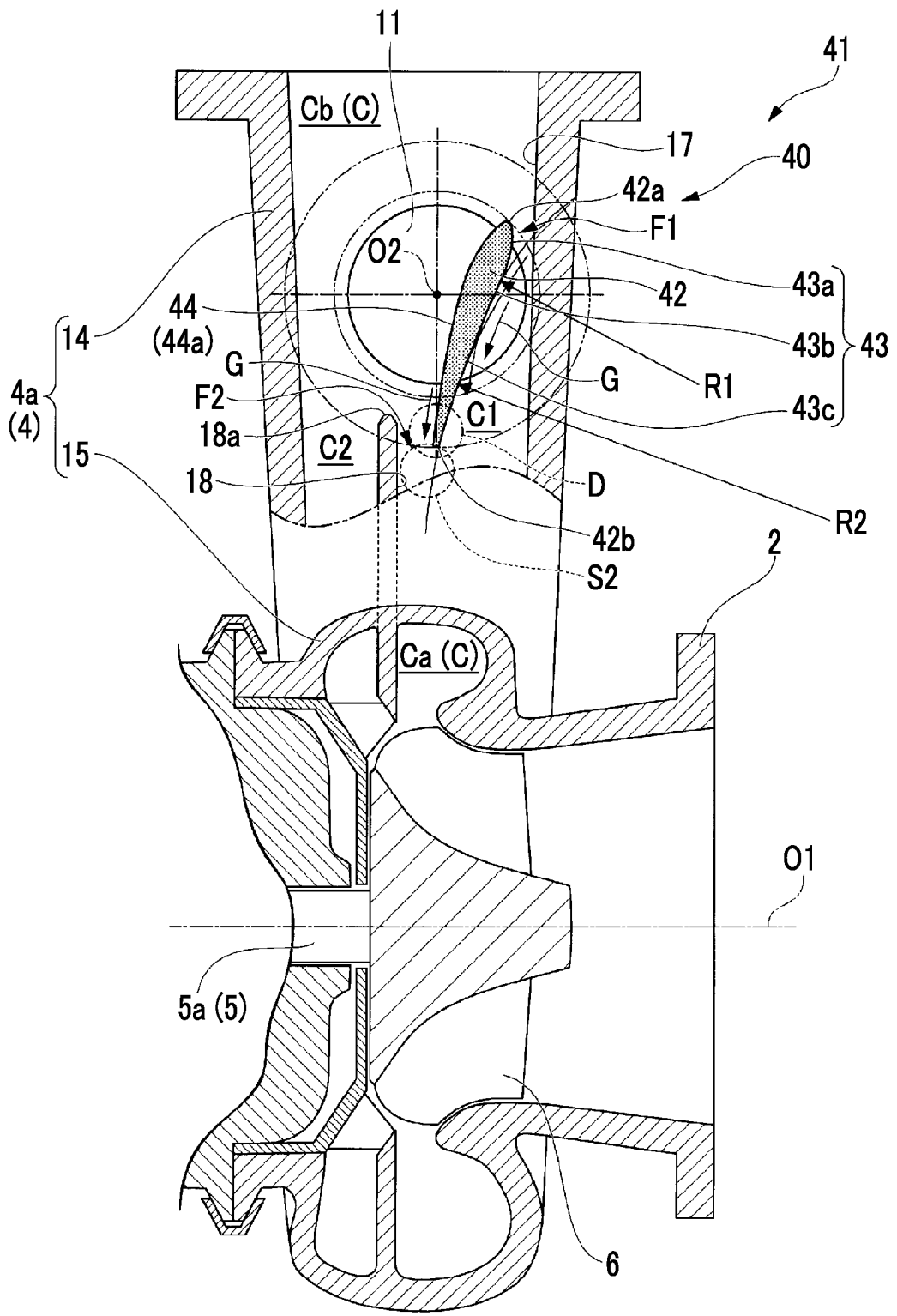
FIG. 5 is a sectional view taken along a surface parallel to an axis of a rotary shaft showing a main portion of a turbocharger according to a third embodiment of the present invention.

In addition, since the second surface 44 is the protrusion surface 44a, if the valve body 42 approaches the state where the valve body 42 is fully closed, after a decrease rate of the flow path width between the division wall surface 18 and the valve body 42 rapidly increases on the upstream side in the downstream-side narrowed flow path F2, the decrease rate of the flow path width gradually decreases (refer to a portion D in FIG. 5). That is, the downstream-side narrowed flow path F2 is formed in a bell mouth shape in which the flow path area increases toward the downstream side.

As a result, the exhaust gas G which flows along the protrusion surface 44a of the second surface 44 is accelerated toward the downstream side in the downstream-side narrowed flow path F2, and the static pressure around the downstream-side narrowed flow path F2 decreases. Accordingly, the exhaust gas G flowing between the wall surface 17 and the valve body 42 is accelerated toward a static pressure decrease region S2 which is formed by the downstream-side narrowed flow path F2, and it is possible to prevent the exhaust gas G from being separated from the first surface 43.

Accordingly, it is possible to decrease a pressure loss in the first flow path C1, and it is possible to prevent the entire pressure from decreasing.

In addition, the second surface 44 of the valve body 42 becomes the protrusion surface 44a, and the downstream-side narrowed flow path F2 is formed in a bell-mouth shape between the division wall surface 18 and the valve body 42. Accordingly, if the exhaust gas G flows, after the exhaust gas G is accelerated, the acceleration decreases. Accordingly, it is possible to prevent the flow of the exhaust gas G from being disturbed due to the rapid acceleration of the exhaust gas G, it is possible to prevent the flow of the exhaust gas G flowing into the second flow path C2 in the suction flow path Cb from being disturbed, and it is possible to prevent occurrence of loss.

[Fourth Embodiment]

Figure 6:
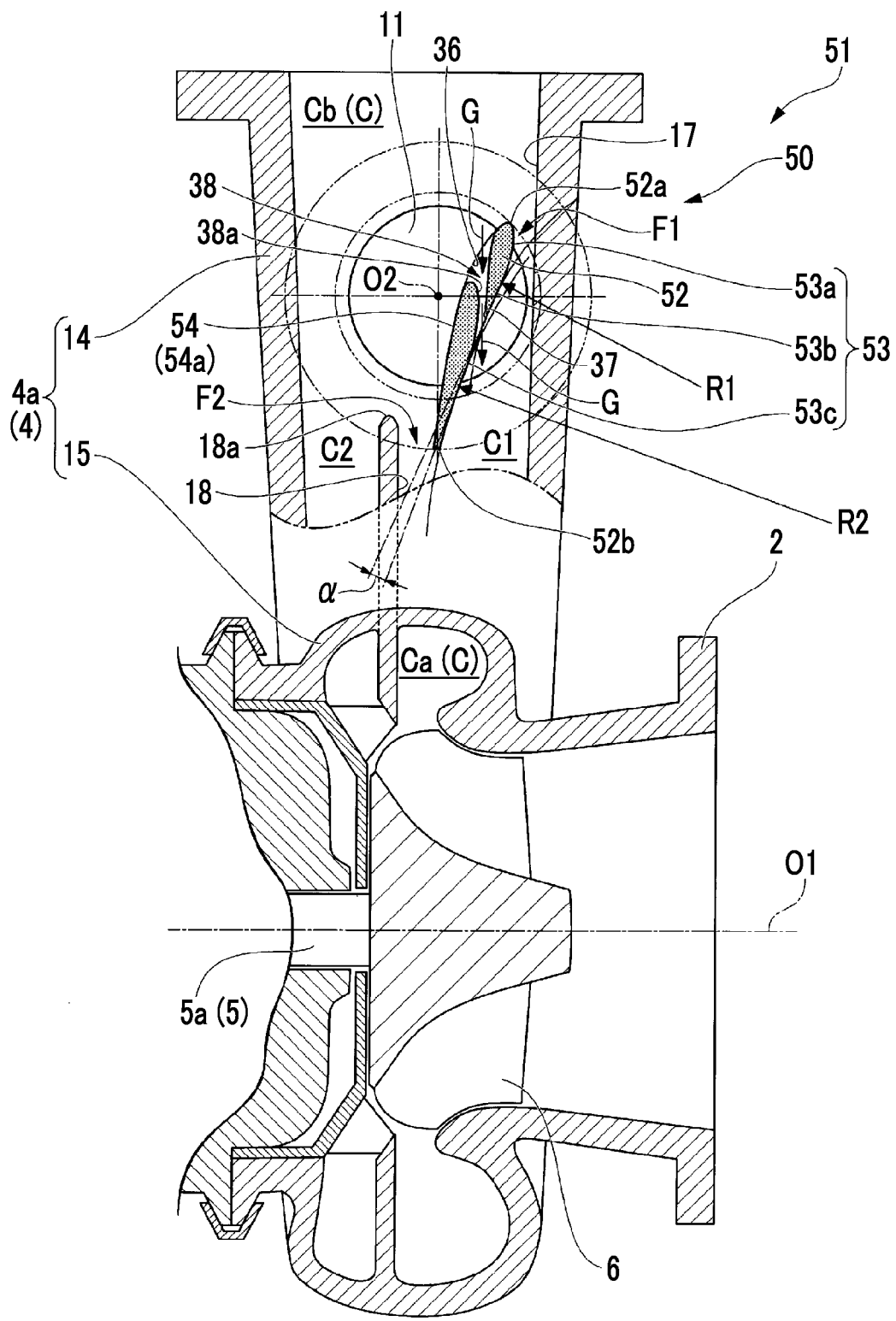
FIG. 6 is a sectional view taken along a surface parallel to an axis of a rotary shaft showing a main portion of a turbocharger according to a fourth embodiment of the present invention.

Next, a turbocharger 51 according to a fourth embodiment of the present invention will be described with reference to FIG. 6.

In addition, the same reference numerals are assigned to the same components similar to those of the first embodiment to the third embodiment, and detailed descriptions thereof are omitted.

In the present embodiment, a valve body 52 of an on-off valve device 50 is different from those of the first embodiment to the third embodiment.

Similarly to the valve body 42 of the third embodiment, the valve body 52 includes a protrusion surface 53a, a first recessed surface 53b, and a second recessed surface 53c as the first surface 53, and includes a protrusion surface 54a as a second surface 54. In addition, similarly to the second embodiment, the upstream-side opening 36, the downstream-side opening 37, and the through hole portion 38 are formed in the valve body 52.

In the present embodiment, the downstream-side opening 37 is formed around a boundary position between the first recessed surface 53b and the second recessed surface 53c in the first surface 53.

According to the turbocharger 51 of the present embodiment, similarly to the second embodiment, since speeds of the exhaust gas G on the downstream side of the valve body 52 are distributed so as to be uniformed, it is possible to decrease a pressure loss, and it is possible to further prevent the entire pressure from decreasing. Accordingly, it is possible to further improve the operation efficiency of the turbocharger 51.

In addition, compared to a case where the first surface 53 is linearly formed, since the first surface 53 is formed to be curved by the first recessed surface 53b and the second recessed surface 53c, it is possible to further accelerate the exhaust gas G along the first surface 53.

That is, an angle difference a between an inclination of a tangential line of the first surface 53 on the upstream side (leading edge 52a side) of the downstream-side opening 37 and an inclination of a tangential line of the first surface 53 on the downstream side (trailing edge 52b side) of the downstream-side opening 37 exists. Accordingly, the exhaust gas G flowing out from the downstream-side opening 37 flows so as to be pressed by the second recessed surface 53c, and it is possible to prevent separation of a boundary layer flow on the first surface 53.

[Fifth Embodiment]

Next, a turbocharger 61 according to a fifth embodiment of the present invention will be described with reference to FIGS. 7A and 7B.

In addition, the same reference numerals are assigned to the same components similar to those of the first embodiment to the fourth embodiment, and detailed descriptions thereof are omitted.

In the present embodiment, the turbocharger 61 has the configuration similar to that of the first embodiment. However, a rotary portion 63 of an on-off valve device 60 which rotates a valve body 62 is different from those of the first embodiment to the fourth embodiment. The valve body 62 has the shape similar to that of the valve body 10 of the first embodiment.

The rotary portion 63 is provided to be inserted into the suction flow path Cb from an opening hole 65 which is open to the inlet portion 14 of the turbine housing 4a on one side (the inner side on the paper surface of FIG. 7A in the present embodiment) in the direction of the axis O2 which is the rotation center of the valve body 62. That is, the rotary portion 63 is separately manufactured to the turbine housing 4a and is attached to the turbine housing 4a.

Figure 7B:
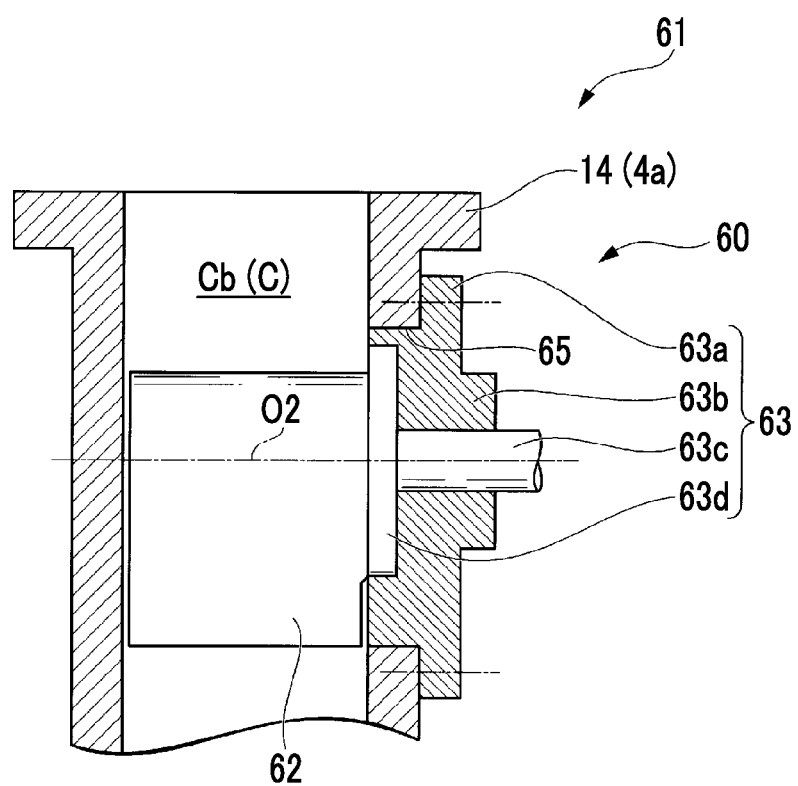
FIG. 7B is a sectional view showing the main portion of the turbocharger according to the fifth embodiment of the present invention and is a sectional view taken along line X-X of FIG. 7A.

More specifically, as shown in FIG. 7B, the rotary portion 63 includes a flanged portion 63a which comes into contact with the opening hole 65 from the outside of the turbine housing 4a. Meanwhile, in a state where the flanged portion 63a comes into contact with the turbine housing 4a, the rotary portion 63 includes a rotary portion body 63b which is flush with the inner surface of the suction flow path Cb.

In addition, the rotary portion 63 includes a shaft member 63c which is formed in a columnar shape with the axis O2 as a center and penetrates the rotary portion body 63b in the direction of the axis O2, and an attachment plate 63d which is interposed between the valve body 62 and the shaft member 63c and is formed in a disk shape.

The attachment plate 63d is provided to be embedded into the rotary portion body 63b, and the surface of the attachment plate 63d on the suction flow path Cb side is flush with the inner surface of the suction flow path Cb along with the surface of the rotary portion body 63b.

In addition, similarly to the first embodiment to the fourth embodiment, the valve body 62 is attached to the attachment plate 63d such that the rotation center of the valve body 62 is positioned outside the valve body 62.

According to the turbocharger 61 of the present embodiment, since the rotary portion 63 is separately provided, it is possible to separately process the rotary portion 63 using a process different from the process of manufacturing the turbine housing 4a. Accordingly, compared to a case where the rotary portion 63 is directly formed to the turbine housing 4a, the processing is easily performed, and it is possible to improve processing accuracy.

Accordingly, it is possible to perform accurate processing by which a clearance between the valve body 62 and the wall surface 17 and a clearance between the valve body 62 and the division wall surface 18 can be decreased as much as possible. Therefore, it is possible to prevent operation efficiency from decreasing due to a leakage flow from the clearances.

In addition, it is possible to easily improve processing accuracy of the attachment plate 63d, it is possible to improve rigidity of the attachment plate 63d, it is possible to improve durability of the attachment portion between the attachment plate 63d and the valve body 62, and reliability is improved.

Here, the rotary portion 63 of the present embodiment may be used instead of the rotary portion 11 of the first embodiment to the fourth embodiment.

[Sixth Embodiment]

Figure 8:
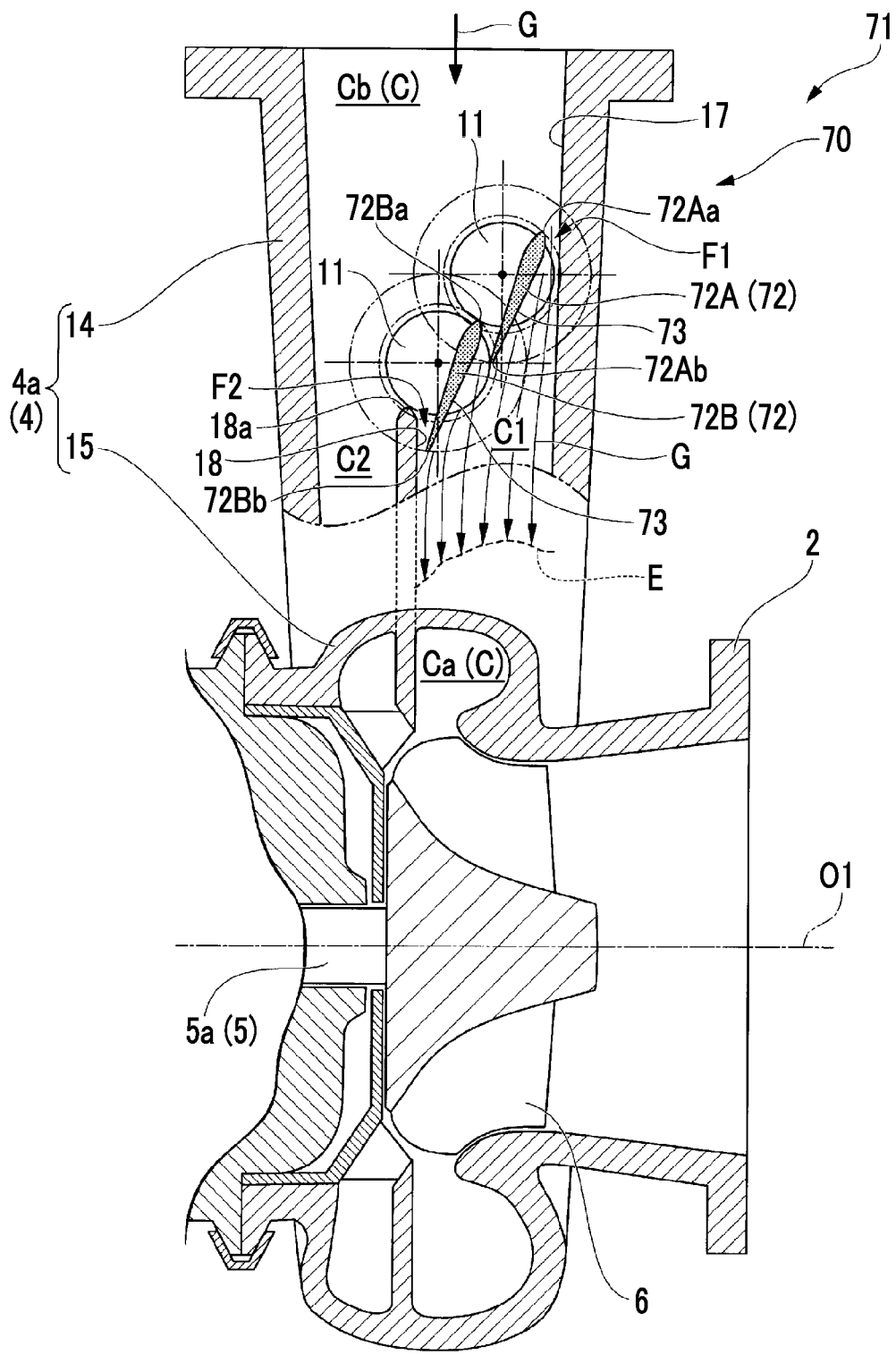
FIG. 8 is a sectional view taken along a surface parallel to an axis of a rotary shaft showing a main portion of a turbocharger according to a sixth embodiment of the present invention.

Next, a turbocharger 71 according to a sixth embodiment of the present invention will be described with reference to FIG. 8.

In addition, the same reference numerals are assigned to the same components similar to those of the first embodiment to the fifth embodiment, and detailed descriptions thereof are omitted.

In the present embodiment, a valve body 72 of an on-off valve device 70 is different from those of the first embodiment to the fourth embodiment.

Multiple valve bodies 72 (two in the present embodiment), in which each valve body has the shape similar to that of the valve body 10 of the first embodiment, are provided so as to be arranged in a row from the upstream side toward the downstream side. The valve bodies 72 are individually rotated by the rotary portions 11.

Here, the valve body 72 on the upstream side is referred to as a first valve body 72A and the valve body 72 on the downstream side is referred to as a second valve body 72B.

The first valve body 72A forms the upstream-side narrowed flow path F1 between the wall surface 17 of the turbine housing 4a and the first valve body 72A at the end on the upstream side (end (leading edge 72Aa) on the outside in the radial direction)).

The second valve body 72B forms the downstream-side narrowed flow path F2 between the division wall surface 18 of the turbine housing 4a and the second valve body 72B at the end on the downstream side (the inside end (trailing edge 72Bb) in the radial direction)).

Here, the state where the multiple valve bodies 72 are arranged in a row means a state where a leading edge 72Ba of the second valve body 72B on the downstream side is disposed to be adjacent to a trailing edge 72Ab of the first valve body 72A on the upstream side. In addition, the first valve body 72A on the upstream side and the second valve body 72B on the downstream side may be not completely arranged in one row, that is, for example, the valve bodies 72 may be disposed at a position slightly deviated in the direction of the axis O1 of the rotary shaft 5.

According to the turbocharger 71 of the present embodiment, since each of the first valve body 72A and the second valve body 72B is rotated, it is possible to arbitrarily change the flow path width of each of the upstream-side narrowed flow path F1 and the downstream-side narrowed flow path F2. In addition, since each of the first valve body 72A and the second valve body 72B is rotated, it is possible to cause the exhaust gas G to flow between the first valve body 72A and the second valve body 72B from the upstream side toward the downstream side.

Since the exhaust gas G flows between the valve bodies 72 and flows to first surface 73 side of each of the first valve body 72A and the second valve body 72B, a static pressure decreases at the outflow position of the exhaust gas. Accordingly, it is possible to accelerate the exhaust gas G flowing along the first surface 73 toward the downstream side. As a result, as shown by a broken line E in FIG. 8, since speeds of the exhaust gas G on the downstream side of the second valve body 72B positioned on the downstream side are distributed so as to be uniformed, it is possible to decrease a pressure loss, and it is possible to further prevent the entire pressure from decreasing.

In addition, by selecting a rotation angle of each valve body 72, the entirety of the multiple valve bodies arranged in a row has a shape protruding toward the division wall surface 18 or has a shape protruding toward the wall surface 17, and the entirety of the valve body 72 can be an arbitrary shape. Accordingly, by rotating each valve body 72 according to the situation of the flow field of the exhaust gas G, it possible to effectively prevent separation or the like.

[Modification Example of First to Sixth Embodiments]

Figure 9:
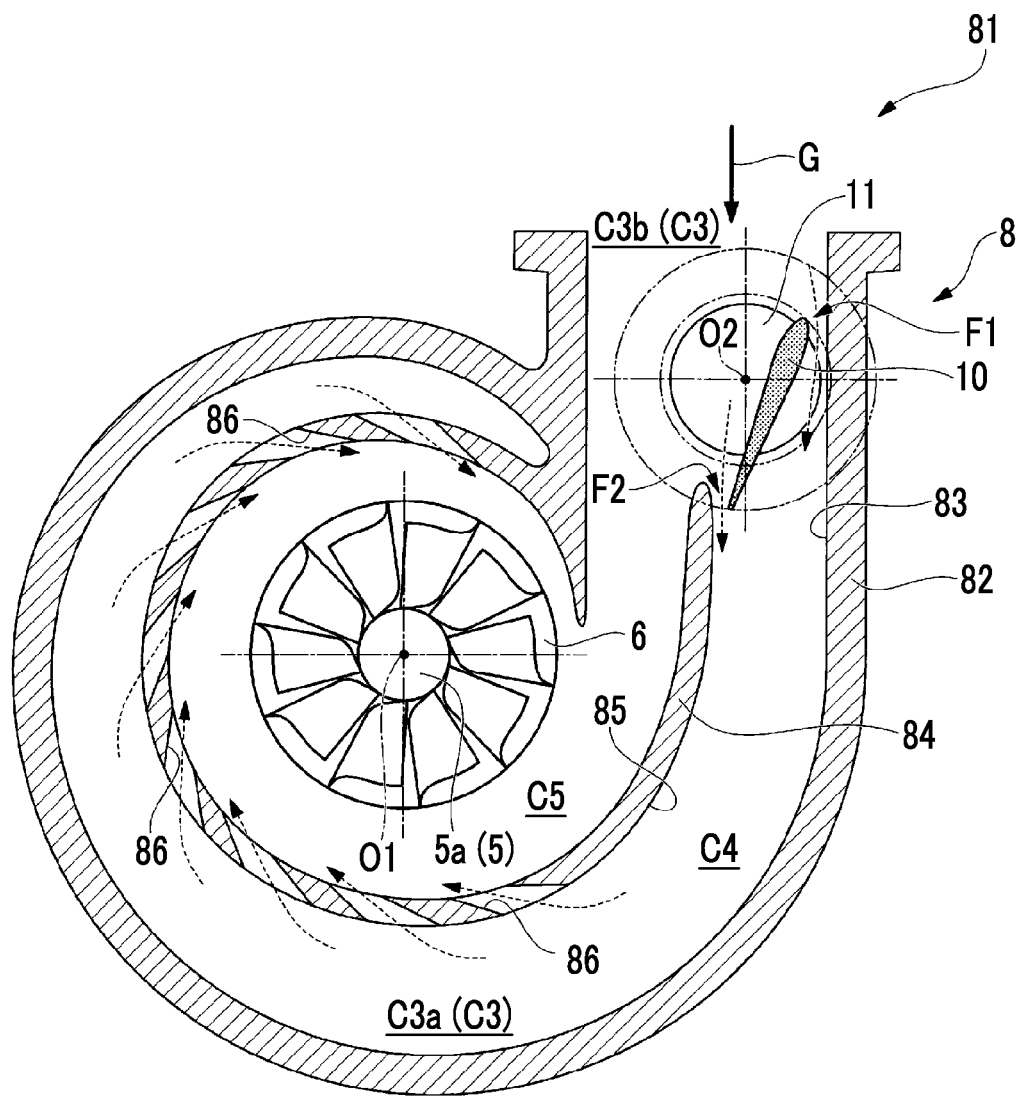
FIG. 9 is a sectional view orthogonal to an axis of a rotary shaft showing a main portion of a turbocharger according to a first modification example of the first to sixth embodiments of the present invention.

For example, as shown in FIG. 9 (first modification example), the on-off valve device 8 (30, 40, 50, 60, 70) may be also applied to a turbocharger 81 having a structure in which a scroll flow path C3a and a suction flow path C3b in the flow path C3 are divided into two in the radial direction in a cross section orthogonal to the axis O1. In other words, the scroll flow path C3a and the suction flow path C3b are divided into two in the direction intersecting the flow direction of the exhaust gas G.

That is, the scroll flow path C3a and the suction flow path C3b are configured of a first flow path C4 on the outside in the radial direction and a second flow path C5 on the inside in the radial direction which are adjacent to each other via the division wall 84 which is spirally formed with the axis O1 as a center. Multiple through holes 86 through which the exhaust gas G flows from the first flow path C4 toward the second flow path C5 are formed in the division wall 84 at intervals in the circumferential direction.

Each of the through holes 86 is largely open to the first flow path C4 side, is open to the second flow path C5 side so as to be smaller than the opening to the first flow path C4 side, and is formed to be inclined in the rotation direction of the turbine rotor blade 6 from the outside in the radial direction toward the inside in the radial direction.

The valve body 10 (32, 42, 52, 62, and 72) in the on-off valve device 8 (30, 40, 50, 60, and 70) is disposed in the first flow path C4, and is disposed between a wall surface 83 (a surface (first wall surface) facing the inside in the radial direction of the axis O1) of the housing 82 forming the first flow path C4 and a division wall surface 85 (a surface (second wall surface) facing the outside in the radial direction of the axis O1) in the division wall 84.

The valve body 10 (32, 42, 52, 62, 72) is provided in the housing 82 such that the axis O2 which is the rotating shaft of the valve body 10 is positioned along the axis O1.

In addition, in the above-described embodiment, the example in which the flow path C (C3) is divided into two in the direction (or the radial direction) of the axis O1 is described. However, the prevent invention is not limited to the case where the flow path C (C3) is configured to be divided into multiple paths, and the flow path C(C3) may be configured of a single flow path.

Figure 10:
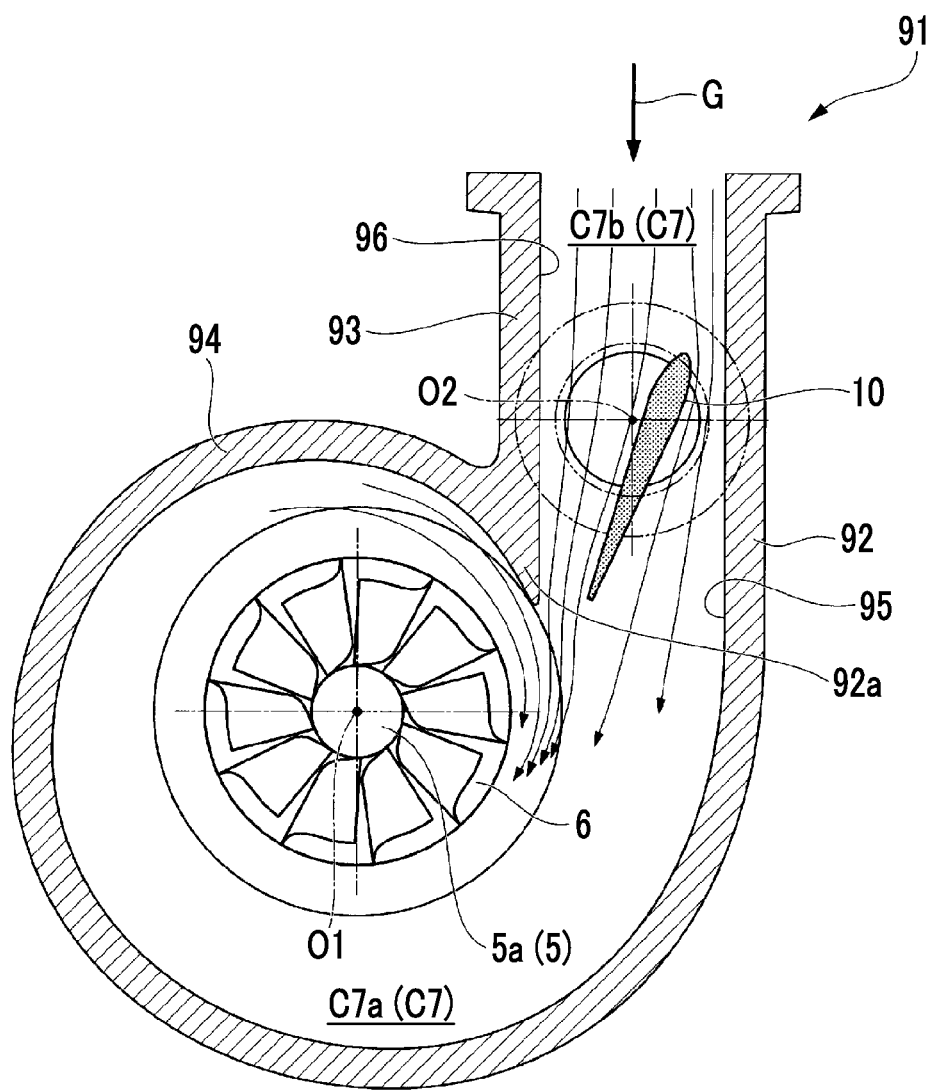
FIG. 10 is a sectional view orthogonal to an axis of a rotary shaft showing a main portion of a turbocharger according to a second modification example of the first to sixth embodiments of the present invention.

Specifically, as shown in FIG. 10 (second modification example), in a turbocharger 91, a flow path C7 (scroll flow path C7a and suction flow path C7b) which is a single flow path is formed in the housing 92.

In the example shown in FIG. 10, the suction flow path C7b is formed in an inlet portion 93 which extends toward and is open to the outside in the radial direction of the axis O1, and the scroll flow path C7a is formed inside a scroll portion 94 which spirally extends toward the turbine rotor blade 6 in the circumferential direction to be continuous to the inlet portion 93.

In addition, the suction flow path C7b is formed between a first wall surface 95 which is the wall surface of the housing 92 and a second wall surface 96 which faces the first wall surface 95 in the direction intersecting the axis O1.

In the housing 92 which is the connection portion between the inlet portion 93 and the scroll portion 94, a tongue portion 92a is formed in the scroll flow path C7a so as to extend along the circumferential direction of the axis O1. The inner surface of the tongue portion 92a forms the end of the second wall surface 96.

Here, in the present embodiment, the scroll portion 94 starts at the position at which the housing 92 starts so as to be wound in a spiral shape, the tip of the tongue portion 92a is the "starting", and the portion on the downstream side of the tip of the tongue portion 92a is the scroll portion 94.

The valve body 10 (32, 42, 52, 62, 72) in the on-off valve device 8 (30, 40, 50, 60, 70) is disposed between the first wall surface 95 and the second wall surface 96 in the suction flow path C7b.

In addition, the valve body 10 (32, 42, 52, 62, 72) is provided in the housing 92 such that the axis O2 which is the rotating shaft of the valve body 10 is positioned along the axis O1.

If the valve body 10 rotates about the axis O2, the trailing edge 10b of the valve body 10 approaches or go away from the tongue portion 92a.

Figure 11:
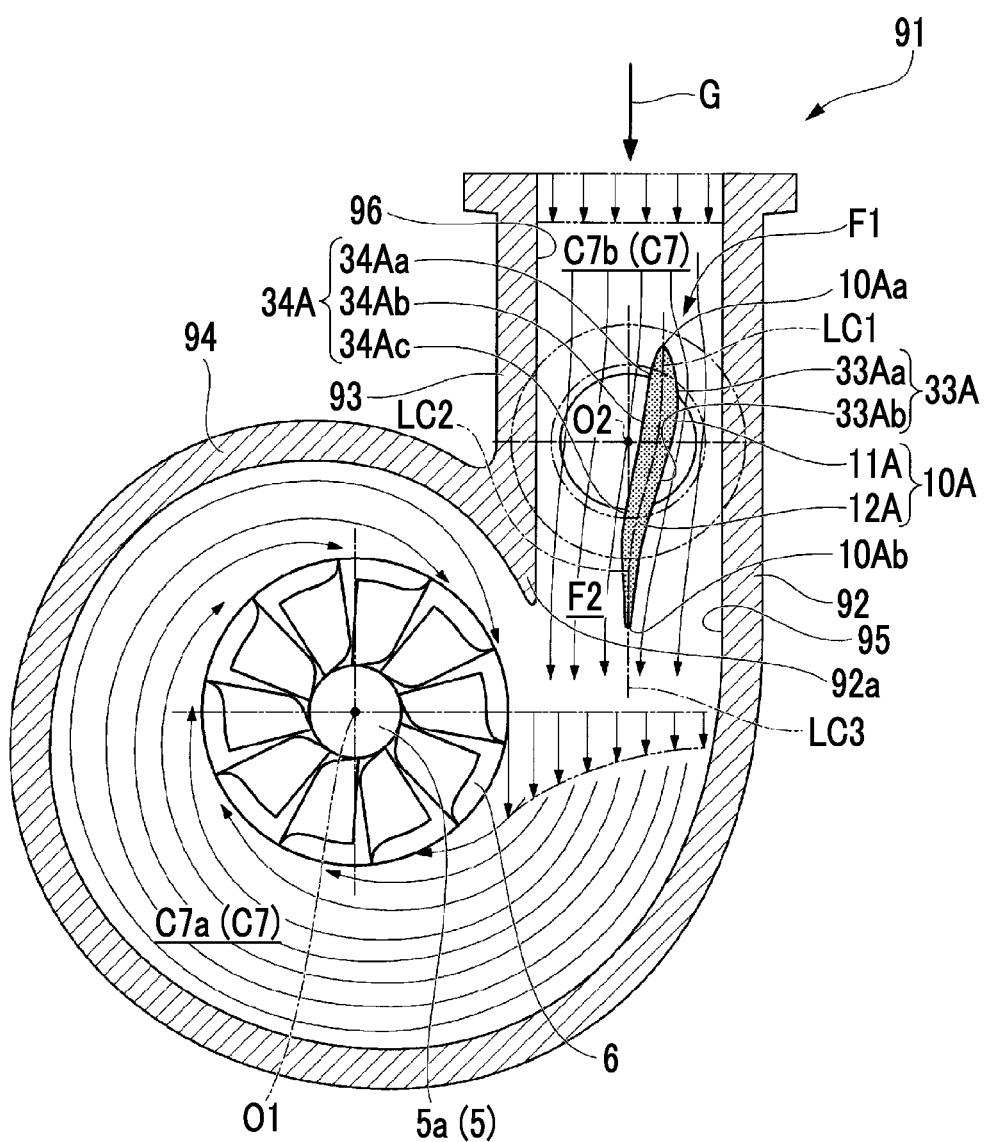
FIG. 11 is a sectional view orthogonal to an axis of a rotary shaft showing a main portion of a turbocharger according to a third modification example of the first to sixth embodiments of the present invention.

In addition, in the above-described embodiment, the valve body may be a valve body 10A having a shape shown in FIG. 11 (third modification example) different from the valve body 10 shown in FIG. 10.

That is, in the example shown in FIG. 11, the valve body 10A includes a first portion 11A includes a first portion 11A which is positioned on the upstream side in the flow of the exhaust gas G, and a second portion 12A which extends to the downstream side so as to be continuous to the first portion 11A.

The first portion 11A and the second portion 12A are connected to each other at an approximately intermediate position in the extension direction of the valve body 10A.

The first portion 11A is a portion which is positioned at the end on the upstream side (end (leading edge 10Aa) on the outside in the radial direction) of the valve body 10A, and the upstream-side narrowed flow path F1 is formed between the first wall surface 95 and the first portion 11A.

The second portion 12A is a portion which is positioned at the end on the downstream side (the inside in the radial direction (trailing edge 10Ab)) of the valve body 10A, and the down-side narrowed flow path F2 is formed between the second wall surface 96 and the second portion 12A. The second portion 12A is disposed to be closer to the second wall surface 96 side than the first portion 11A.

That is, a center axis LC2 passing through the center in the thickness direction along the circumferential direction in the second portion 12A is curved from a center axis LC1 in the first portion 11A and linearly extends toward the downstream side.

In addition, the center axis LC2 of the second portion 12A extends to be parallel to the center axis LC1 of the first portion 11A toward the trailing edge 10Ab. That is, the second portion 12A extends toward the downstream side in the extension direction of the first portion 11A.

In addition, when the valve body 10A is fully opened (in the case of FIG. 11) in which the upstream-side narrowed flow path F1 and the downstream-side narrowed flow path F2 have the maximum flow path areas, the valve body 10A is provided such that the center axis LC2 of the second portion 12A coincides with the direction orthogonal to the direction in which the axis O1 extends, that is, a center axis LC3 in the width direction (the direction orthogonal to the flow of the exhaust gas G) of the scroll flow path C7 of the inlet portion 93.

In the valve body 10A, as a first surface 33A facing the first wall surface 95 in the valve body 10A, a protrusion surface 33Aa and a recessed surface 33Ab continuous to the protrusion surface 33Aa are formed.

The protrusion surface 33Aa is formed in a protrusion shape so as to gradually approach the first wall surface 95 while being curved from the leading edge 10Aa of the valve body 10A toward the trailing edge 10Ab side.

The recessed surface 33Ab is smoothly continued to the downstream side of the protrusion surface 33Aa in a stepless manner and is curved to be recessed in the direction going away from the first wall surface 95 to reach the trailing edge 10Ab.

In addition, in the valve body 10A, as a second surface 34A facing the second wall surface 96 in the valve body 10A, a first protrusion surface 34Aa, a recessed surface 34Ab continuous to the first protrusion surface 34Aa, and a second protrusion surface 34Ac continuous to the recessed surface 34Ab are formed.

The first protrusion surface 34Aa is curved to protrude toward the side going away from the first surface 33A while being curved from the leading edge 10Aa of the valve body 10A toward the trailing edge 10Ab side.

The recessed surface 34Ab is smoothly continued to the downstream side of the first protrusion surface 34Aa in a stepless manner and is curved to be recessed toward the first surface 33A.

The second protrusion surface 34Ac is smoothly continued to the downstream side of the recessed surface 34Ab in a stepless manner and is curved to be recessed toward the first surface 33A to reach the trailing edge 10Ab.

By providing the valve body 10A having the above-described shape, in the first surface 33A side, after the exhaust gas G passing through the upstream-side narrowed flow path F1 is guided by the protrusion surface 33Aa, the exhaust gas G is guided to the downstream side by the recessed surface 33Ab.

Here, in the region (downstream-side enlargement flow path) on the downstream side of the upstream-side narrowed flow path F1, when a flow path area is enlarged toward the downstream side, the area enlargement ratio increases on the upstream side, and the area enlargement ratio decreases on the downstream side. Accordingly, the decrease rate of the speed of the exhaust gas G passing through the upstream-side narrowed flow path F1 decreases from the upstream side toward the downstream side. Therefore, it is possible to prevent the speed of the exhaust gas G form being rapidly decreased, and it is possible to decrease a pressure loss.

Moreover, even when the opening degree of the valve body 10A is changed, in the downstream side, it is possible to further decrease the angle difference between the inlet portion 93 and the center axis LC3 compared to the above-described various valve bodies. Particularly, since the valve body 10A is provided such that the center axis LC2 of the second portion 12A coincides with the center axis LC3 of the inlet portion 93 when the valve body 10A is fully opened, the exhaust gas G reaching the scroll portion 94 from the inlet portion 93 flows to be parallel to the center axis LC3 of the inlet portion 93.

Accordingly, the exhaust gas G can smoothly reach the starting of the scroll portion 94, that is, the winding starting of the scroll flow path C7a while the speed of the exhaust gas G decreases. Therefore, it is possible to decrease the flow velocity of the exhaust gas G at the position on the outside in the radial direction in the starting of the scroll portion 94, and it is possible to increase the flow velocity of the exhaust gas G at the position on the inside in the radial direction. As a result, it is possible to cause the exhaust gas G to effectively flow into the scroll flow path C7a of the scroll portion 94.

In addition, even when the opening degree of the valve body 10A is changed, the second portion 12A is closer to the second wall surface 96 side compared to the above-described various valve bodies. Accordingly, even when an incidence angle (inflow angle) of the exhaust gas G at the leading edge 10Aa is suppressed so as to be small, it is possible to decrease the flow path area of the downstream-side narrowed flow path F2, and it is possible to increase flow velocity of the exhaust gas G passing through the downstream-side narrowed flow path F2. Meanwhile, as described above, since the enlargement ratio of the flow path area decreases on the downstream side of the upstream-side narrowed flow path F1 between the first wall surface 95 and the valve body 10A, it is possible to prevent the exhaust gas G from being separated from the first surface 33A. Accordingly, problems do not occur even when the incidence angle at the leading edge 10Aa is small, and it is possible to further decrease the pressure loss of the exhaust gas G.

[Seventh Embodiment]

Next, a turbocharger 101 according to a seventh embodiment of the present invention will be described with reference to FIGS. 12 to 14.

In addition, the same reference numerals are assigned to the same components similar to those of the first embodiment to the sixth embodiment, and detailed descriptions thereof are omitted.

The turbocharger 101 of the present embodiment has the turbocharger 91 of the second modification example shown in FIG. 10 as a basic configuration, and the turbocharger 91 further includes scroll guide blades (guide portions) 102 provided in the scroll flow path C7a.

Figure 12:
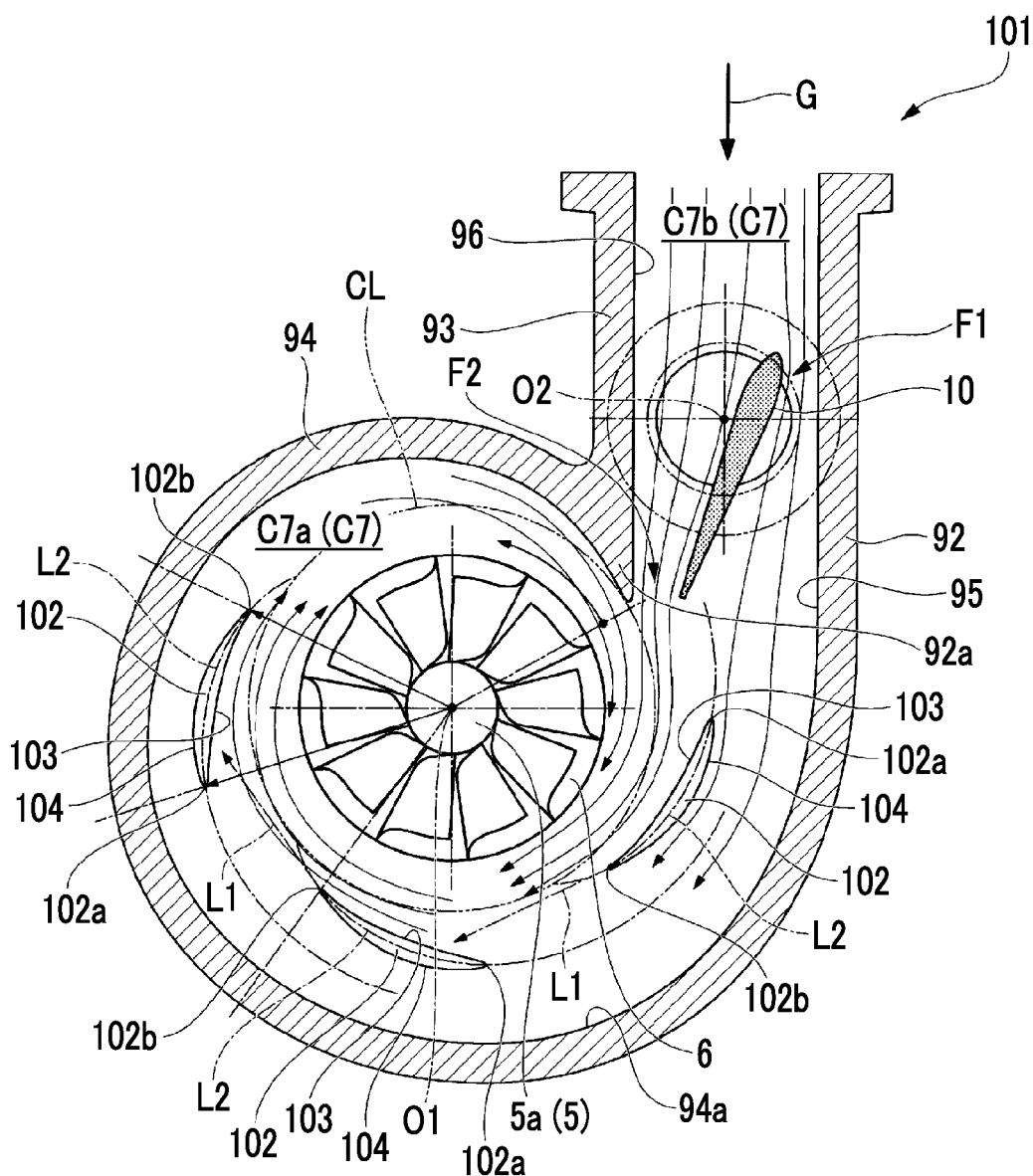
FIG. 12 is a sectional view orthogonal to an axis of a rotary shaft showing a main portion of a turbocharger according to a seventh embodiment of the present invention.
Figure 13:
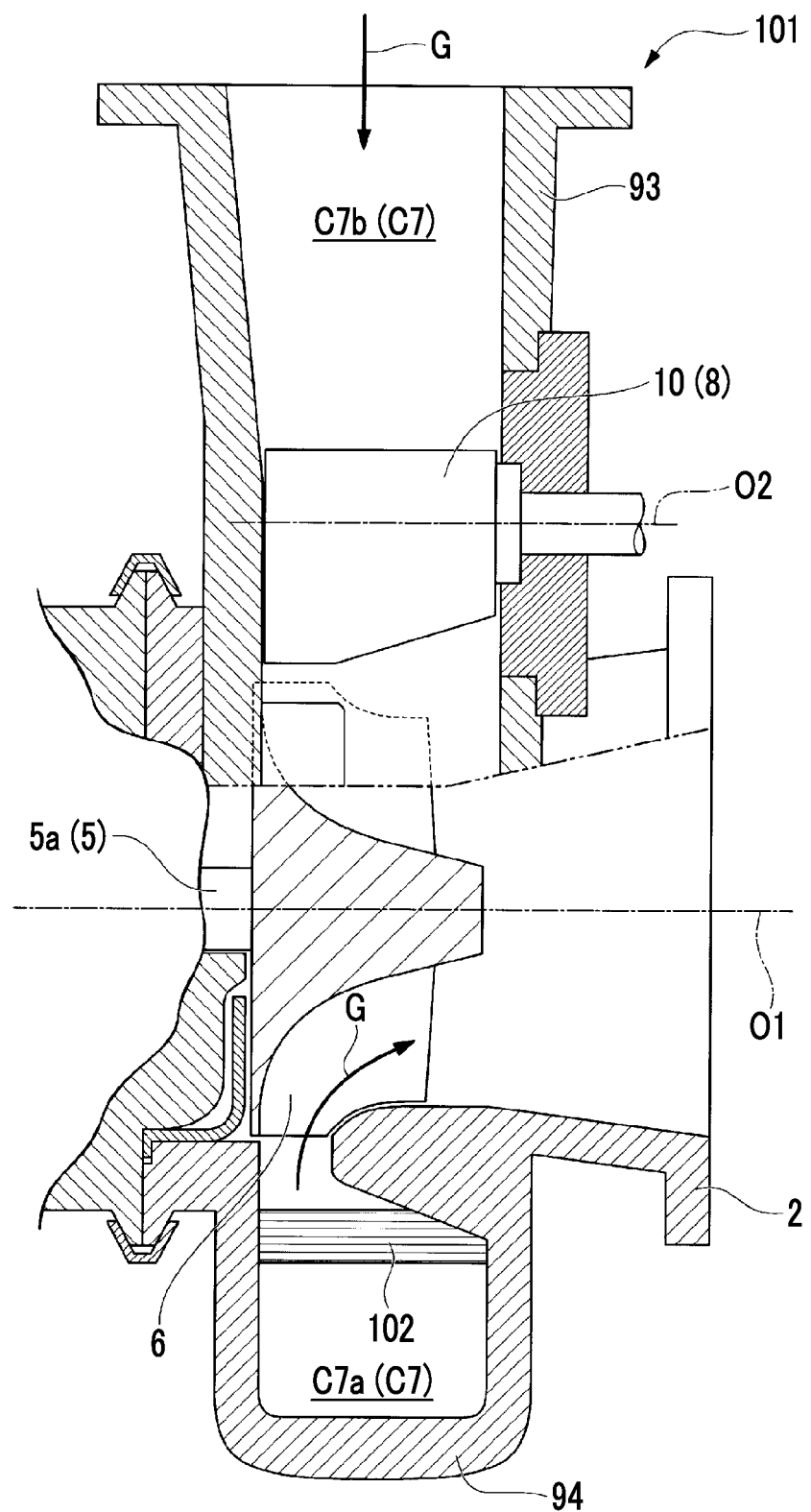
FIG. 13 is a sectional view taken along a surface parallel to the axis of the rotary shaft showing the main portion of the turbocharger according to the seventh embodiment of the present invention.

Here, arrows inside the scroll flow path C7a shown in FIG. 12 indicate the flows of the exhaust gas G. Multiple scroll guide blades 102 are disposed in the scroll flow path C7a to go away from each other in the circumferential direction on the outside in the radial direction of the turbine rotor blade 6, and surround the turbine rotor blade 6 from the outside in the radial direction.

In addition, at least a portion of the upstream side (leading edge 102a side) of the scroll guide blade 102 which is disposed on the most upstream side is positioned so as to be closer to the outside in the radial direction than the lower portion. The trailing edge 102b of each scroll guide blade 102 is positioned outside a virtual circle CL which passes through the tip of the tongue portion 92a and has the axis O1 as a center.

Each scroll guide blade 102 is formed in a plate shape extending in the circumferential direction, and the cross sectional shape of the scroll guide blade 102 orthogonal to the axis O1, that is, the shape of the scroll guide blade 102 when viewed in the extension direction of the rotary shaft 5 is formed in a blade shape.

That is, the scroll guide blade 102 includes a guide surface 103 facing the inside in the radial direction and an outer surface 104 facing the outside in the radial direction. The guide surface 103 is a curved surface which is formed to be recessed as it goes away from the rotary shaft 5, and the outer surface 104 is a curved surface which is formed so as to protrude toward the wall surface 94a (inner surface of the scroll flow path C7a ) of the scroll portion 94.

Accordingly, after the thickness dimension of the scroll guide blade 102 in the radial direction from the leading edge 102a which becomes the end on the upstream side to the trailing edge 102b which becomes the end on the downstream side gradually increases, the thickness dimension decreases.

The guide surface 103 in the scroll guide blade 102 positioned on the upstream side of the flow of the exhaust gas G is provided so as to guide the exhaust gas G toward the guide surface 103 in the scroll guide blade 102 positioned on the downstream side.

In addition, in the present embodiment, in the guide surface 103 in the trailing edge 102b in the scroll guide blade 102 on the upstream side among the scroll guide blades 102 adjacent to each other in the circumferential direction, each scroll guide blade 102 is disposed such that an extension line L1 of a tangential line of the guide surface 103 in the cross section orthogonal to the rotary shaft 5 passes through the guide surface 103 of the scroll guide blade 102 on the downstream side.

Figure 14:
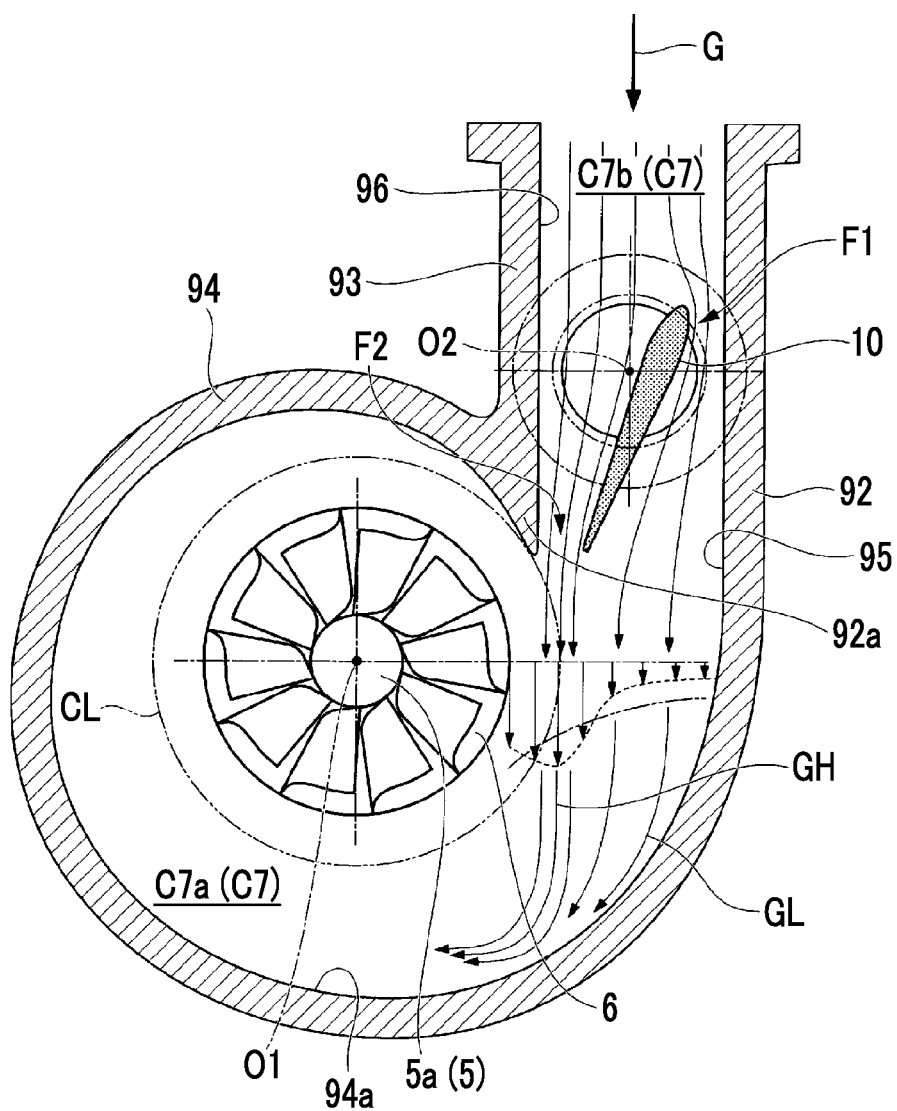
FIG. 14 is a sectional view orthogonal to an axis of a rotary shaft showing a main portion of a turbocharger in a case where a scroll guide blade is not provided.

Meanwhile, as shown in FIG. 14, in a case where the scroll guide blades 102 are not provided, a flow velocity distribution is generated in which the flow velocity of the exhaust gas G in the inside in the radial direction passing through the downstream-side narrowed flow path F2 is greater than the flow velocity of the exhaust gas G in the outside in the radial direction passing through the upstream-side narrowed flow path F1, and a high-speed flow GH of the exhaust gas G is generated in the inside in the radial direction.

In addition, the high-speed flow GH in the inside in the radial direction is not directed in the extension direction of the scroll flow path C7a in the scroll portion 94, that is, in the circumferential direction due to an inertia force of the high-speed flow GH, and the high-speed flow GH is directed to the outside in the radial direction toward the wall surface 94a of the scroll portion 94. As a result, it is not possible to introduce the high-speed flow GH to the turbine rotor blade 6, and there is a problem that operation efficiency decreases.

In addition, since the high-speed flow GH is mixed with a low-speed flow GL in the outside in the radial direction passing through the upstream-side narrowed flow path F1, there is problem that a press loss occurs.

With respect to this, in the present embodiment, the high-speed flow GH in the inside in the radial direction which is easily generated in the state where the opening degree is small is changed to the flow in the circumferential direction by the guide surface 103 of the scroll guide blade 102 disposed on the most upstream side, and can be sequentially guided to the guide surface 103 of the scroll guide blades 102 on the downstream side. Accordingly, since it is possible to the high-speed flow GH in the circumferential direction and it is possible to introduce the high-speed flow GH into the turbine rotor blade 6, it is possible to improve operation efficiency.

In addition, effects by which the flow path area of the scroll flow path C7a in the scroll portion 94 is decreased can be obtained by the multiple scroll guide blades 102. Accordingly, it is possible to increase efficiency as a variable capacity turbine having the scroll portion in which the flow path area is variable.

Moreover, since the cross section of the scroll guide blade 102 is a blade shape, it is possible to smoothly guide the exhaust gas G in the circumferential direction while decreasing a friction loss of the exhaust gas G generated due to the guide surface 103.

In the trailing edge 102b of the guide surface 103 in the scroll guide blade 102 on the upstream side among the scroll guide blades 102 adjacent to each other in the circumferential direction, the extension line L1 of the tangential line of the guide surface 103 in the cross section orthogonal to the axis O1 passes through the guide surface 103 of the scroll guide blade 102 on the downstream side. Accordingly, it is possible to guide the exhaust gas G to come into contact with the guide surface 103 of the scroll guide blade 102 on the downstream side.

Here, in the present embodiment, the scroll guide blade 102 may be formed such that the thickness dimension in the radial direction is decreased in the trailing edge 102b as much as possible. That is, the scroll guide blade 102 has a shape tapered toward the trailing edge 102b. In addition, the cross section of the scroll guide blade 102 may not be a blade shape. For example, the guide surface 103 and the outer surface 104 may be formed in an arc shape. In addition, the cross section of the scroll guide blade 102 may be an elliptical shape or a rectangular shape (flow-strengthening plate shape)

In addition, in the scroll guide blade 102, a line segment L2 which connects the leading edge 102a and the trailing edge 102b to each other and passes through the center in the thickness direction along the radial direction may be a straight line, or a curved line such as a logarithmic spiral curved-line shape, a polynomial curved-line shape, an arc shape, or the like.

[First Modification Example of Seventh Embodiment]

Figure 15:
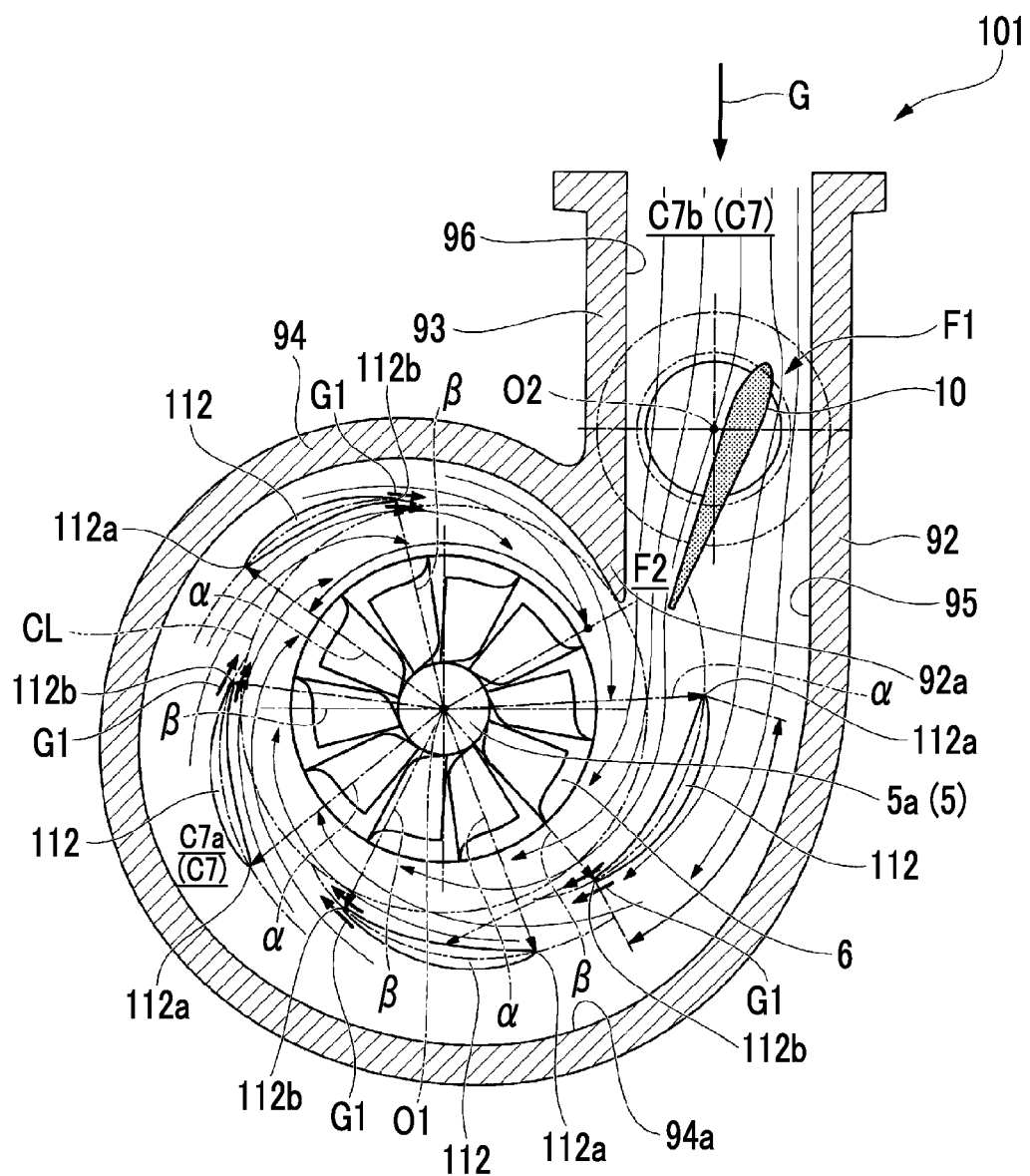
FIG. 15 is a sectional view orthogonal to an axis of a rotary shaft showing a main portion of a turbocharger according to a first modification example of the seventh embodiment of the present invention.

For example, as shown in FIG. 15, the leading edge 112a in the scroll guide blade 112 positioned on the downstream side among the scroll guide blades 112 is positioned to be closer to the inside in the radial direction than the leading edge 112a in the scroll guide blade 112 positioned on the upstream side. That is, a distance α from the axis O1 to the leading edge 112a of each scroll guide blade 112 decreases.

In the scroll portion 94, the flow path area of the scroll flow path C7a decreases toward the downstream side. Here, if a new scroll guide blade 112 is provided, since the scroll guide blade 112 occupies a portion of the region of the flow path cross section of the scroll flow path C7a, a block-cage occurs. Particularly, the flow path sectional area on the downstream side of the scroll flow path C7a is smaller than the flow path sectional area on the upstream portion, and if the scroll guide blade 112 which is the same as that on the upstream side of the scroll flow path C7a is installed, a ratio of the sectional area of the scroll guide blade 112 which occupies the scroll sectional area increases.

Accordingly, a so-called wake (back flow G1) is generated on the downstream side, and a loss occurs. However, since the positions of the leading edges 112a of the multiple scroll guide blades 112 are disposed to be gradually closer to the inside in the radial direction toward the downstream side, it is possible to decrease a pressure loss generated due to the block-cage. Accordingly, it is possible to introduce the exhaust gas G passing through the downstream-side narrowed flow path F2 in the circumferential direction according to the shape of the scroll flow path C7a without increasing a loss.

In addition, in the seventh embodiment, similarly, a distance β from the axis O1 to the trailing edge 112b of each scroll guide blade 112 may decrease.

[Second Modification Example of Seventh Embodiment]

Figure 16:
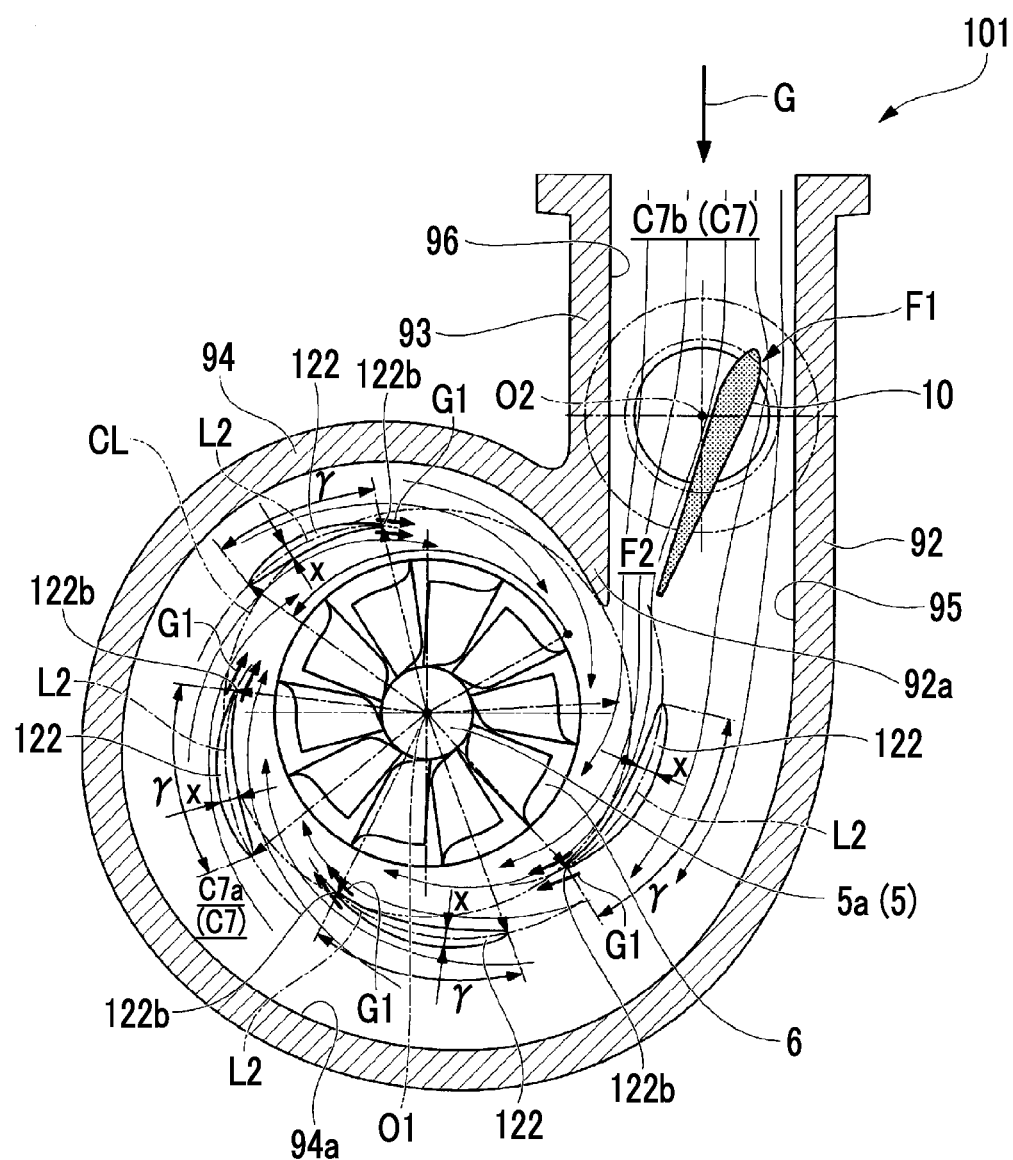
FIG. 16 is a sectional view orthogonal to an axis of a rotary shaft showing a main portion of a turbocharger according to a second modification example of the seventh embodiment of the present invention.

In addition, as shown in FIG. 16, among scroll guide blades 122 adjacent each other in the circumferential direction, a dimension γ in the length direction along the circumferential direction of the scroll guide blade 122 positioned on the downstream side is smaller.

In the scroll portion 94, the flow path area of the scroll flow path C7a decreases toward the downstream side. Accordingly, since the length dimension of the scroll guide blade 122 gradually decreases toward the downstream side, it is possible to prevent a volume ratio of the scroll guide blade 122 occupying the inside of the scroll flow path C7a from increasing. As a result, it is possible to prevent the above-described block-cage. In addition, it is possible to decrease a ratio of the back flow G1 from the scroll guide blade 122 with respect to the entire exhaust gas G inside the scroll flow path C7a. Accordingly, it is possible to decrease a pressure loss generated due to the back flow G1, and it is possible to decrease an exciting force to the turbine rotor blade 6 generated due to the back flow G1.

In addition, among the scroll guide blades 122 adjacent each other in the circumferential direction, a maximum value of a thickness dimension x along the radial direction of the scroll guide blade 122 positioned on the downstream side may decrease.

Even in this case, as described above, it is possible to prevent the volume ratio of the scroll guide blade 122 occupying the inside of the scroll flow path C7a from increasing. Accordingly, it is possible to decrease a pressure loss generated due to the back flow G1, and it is possible to decrease an exciting force to the turbine rotor blade 6 generated due to the back flow G1.

Moreover, in the seventh embodiment, the positions and shapes of the line segments L2 passing through the centers of the scroll guide blades 102 (112, 122) in the thickness directions may be different from each other according to the scroll guide blades 102. This is because a suitable logarithmic spiral curved line is changed by the flow path area of the scroll flow path C7a in the scroll portion 94.

In addition, the installation angles (the angles with respect to the tangential line of the rotary shaft) of the leading edge 102a in the scroll guide blade 102 may be different from each other according to the scroll guide blade 102.

The intervals between the scroll guide blades 102 in the circumferential direction may not be constant.

In addition, in the seventh embodiment, as shown in FIG. 16, the position of the trailing edge 122b of each scroll guide blade 122 may be positioned inside the virtual circle CL which passes through the tip of the tongue portion 92a and has the axis O1 as a center.

In this way, since the scroll guide blade 102 is designed to be formed in a suitable shape and to be positioned at a suitable position according to the design of the scroll flow path C7a, it is possible to introduce the high-speed flow GH in the circumferential direction and to further decrease a pressure loss.

[Third Modification Example of Seventh Embodiment]

Figure 17:
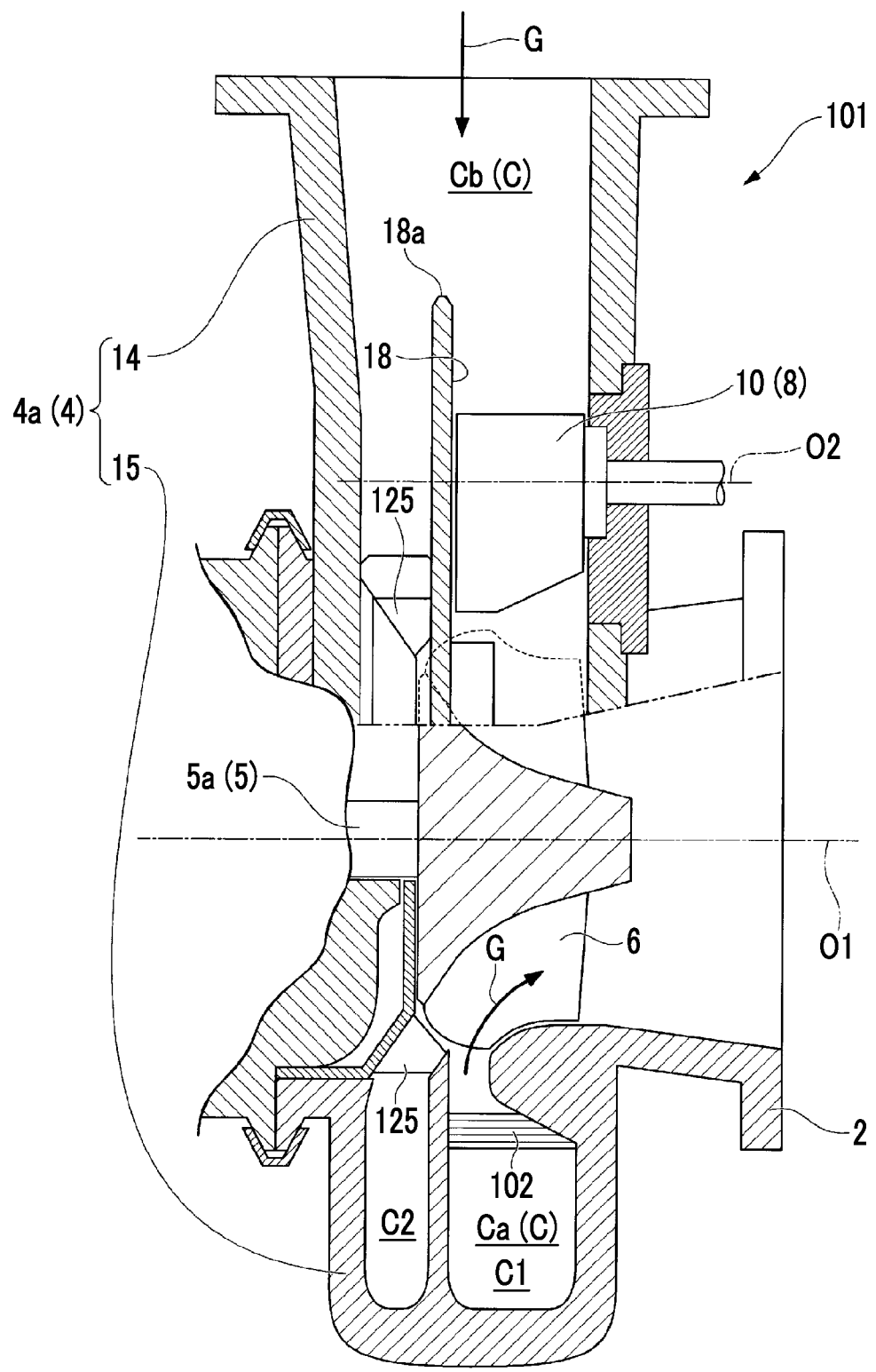
FIG. 17 is a sectional view taken along a surface parallel to an axis of a rotary shaft showing a main portion of a turbocharger according to a third modification example of the seventh embodiment of the present invention.

In addition, as shown in FIG. 17, the scroll guide blade 102 (112, 122) of the seventh embodiment can be applied to the turbocharger 1 of the first embodiment shown in FIG. 2. That is, a fixed nozzle 125 is provided in the second flow path C2 as a nozzle, and the scroll guide blade 102 is provided in the first flow path C1. In the present modification example, the turbine rotor blade 6 is a diagonal rotor blade.

Figure 18:
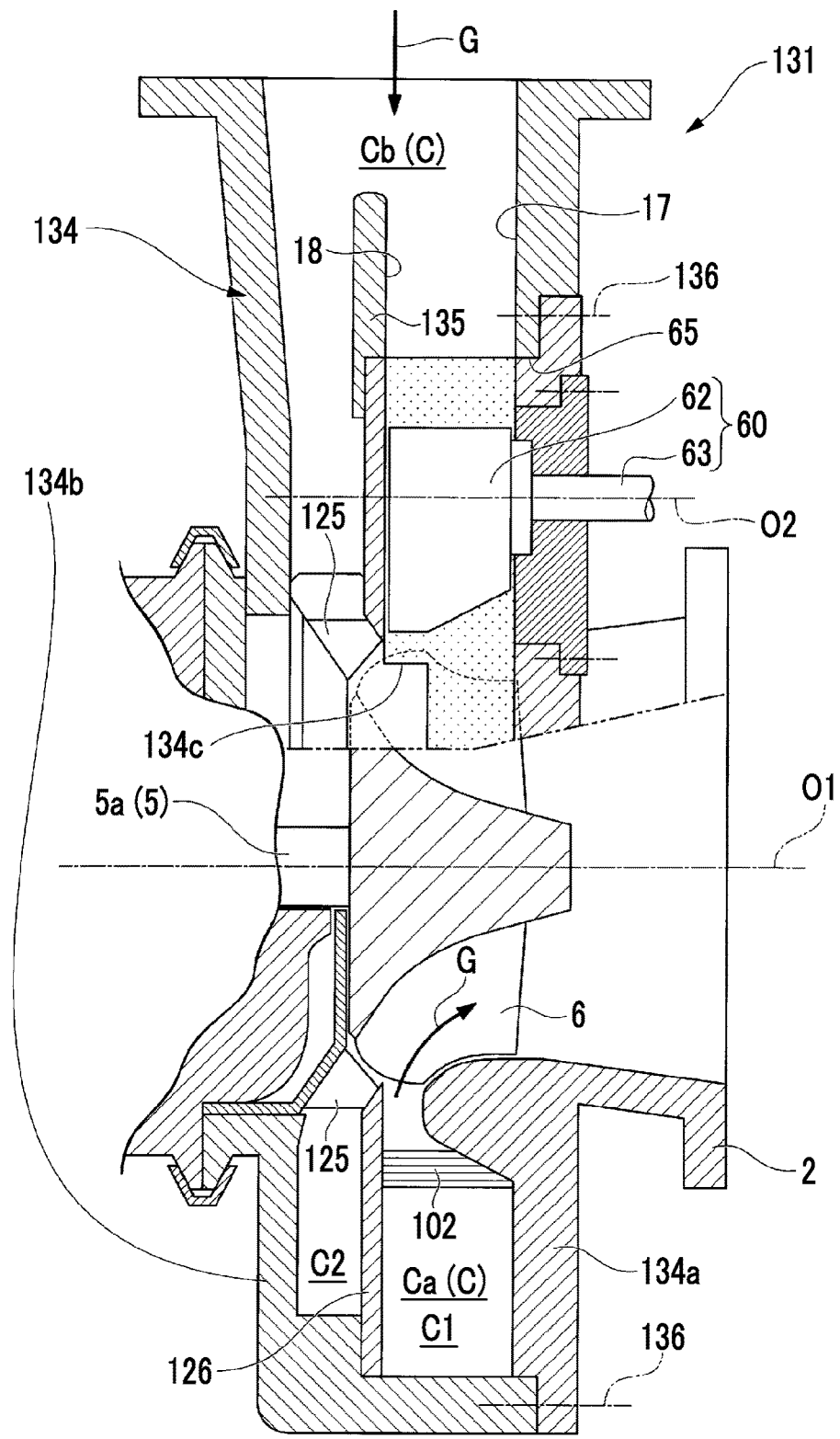
FIG. 18 is a sectional view taken along a surface parallel to an axis of a rotary shaft showing a main portion of a turbocharger according to an eighth embodiment of the present invention.

In the example of FIG. 18, in the case where the valve body 10 is fully closed, the flow rate of the exhaust gas G is determined by the flow rate from the fixed nozzle 125. At this time, by adopting the fixed nozzle 125 and installing an additionally-provided plate-shaped division wall 126 which is fixed to be pressed to the blade tip of the fixed nozzle 125 and the fixed division wall surface 18 in the direction of the axis O1, it is possible to completely remove the gap between the blade tip of the fixed nozzle 125 and the division wall surface 18. Accordingly, it is possible to prevent a leakage loss from the nozzle.

In addition, since the scroll guide blade 102 is also fixed to the additionally-provided plate-shaped division wall 126 so as to be pressed, it is also possible to prevent a leakage loss from the blade tip of the scroll guide blade 102.

[Eighth Embodiment]

Next, a turbocharger 131 according to an eighth embodiment of the present invention will be described with reference to FIG. 18.

In addition, the same reference numerals are assigned to the same components similar to those of the first embodiment to the seventh embodiment, and detailed descriptions thereof are omitted.

In the present embodiment, the turbocharger 131 has the configuration similar to that of the seventh embodiment. However, the on-off valve device 60 which rotates the valve body 10 is similar to that of the fifth embodiment and is separated from a turbine housing 134.

In addition, the turbine housing 134 is divided into two portions having the wall surface 17 side which is the one side in the direction of the axis O1 in a state where a division wall 135 having the formed division wall surface 18 (second wall surface) is interposed therebetween, and the side opposite to the wall surface 17 which becomes the other side in the direction of the axis O1. That is, a one-side turbine housing 134a and the other-side turbine housing 134b are connected to each other using fastening tools 136 such as bolts.

In the one-side turbine housing 134a, the rotary portion 63 is provided to be inserted into the first flow path C1 from one side in the direction of the axis O1. In addition, the scroll guide blade 102 and the tongue portion 134c are integrally formed with the one-side turbine housing 134a so as to protrude toward the other side in the direction of the axis O1.

In the turbocharger 131 of the present embodiment, it is possible to separately manufacture the one-side turbine housing 134a and the other-side turbine housing 134b.

Here, for example, in a case where the turbine housing is formed by casting, if the one-side turbine housing 134a and the other-side turbine housing 134b are integrally formed with each other, it is necessary to use a core so as to form the scroll guide blade 102 along with the scroll flow path Ca and the suction flow path Cb.

Meanwhile, in the turbine housing 134 of the present embodiment, it is possible to form the scroll guide blade 102 which is the member erected on the one-side turbine housing 134a without using the core. Accordingly, it is possible to accurately form the scroll guide blade 102. In addition, it is possible to smoothly finish the guide surface 103 or the outer surface 104 of the scroll guide blade 102. Moreover, since it is possible to smoothly finish the inner surfaces of the scroll flow path Ca and the suction flow path Cb, it is possible to prevent an increase of a flow loss of the exhaust gas G.

[Ninth Embodiment]

Next, a turbocharger 141 according to a ninth embodiment of the present invention will be described with reference to FIG. 19.

In addition, the same reference numerals are assigned to the same components similar to those of the first embodiment to the eighth embodiment, and detailed descriptions thereof are omitted.

In the present embodiment, the turbocharger 101 of the seventh embodiment is the basic configuration, and the on-off valve device 8 of the seventh embodiment is not provided.

Figure 19:
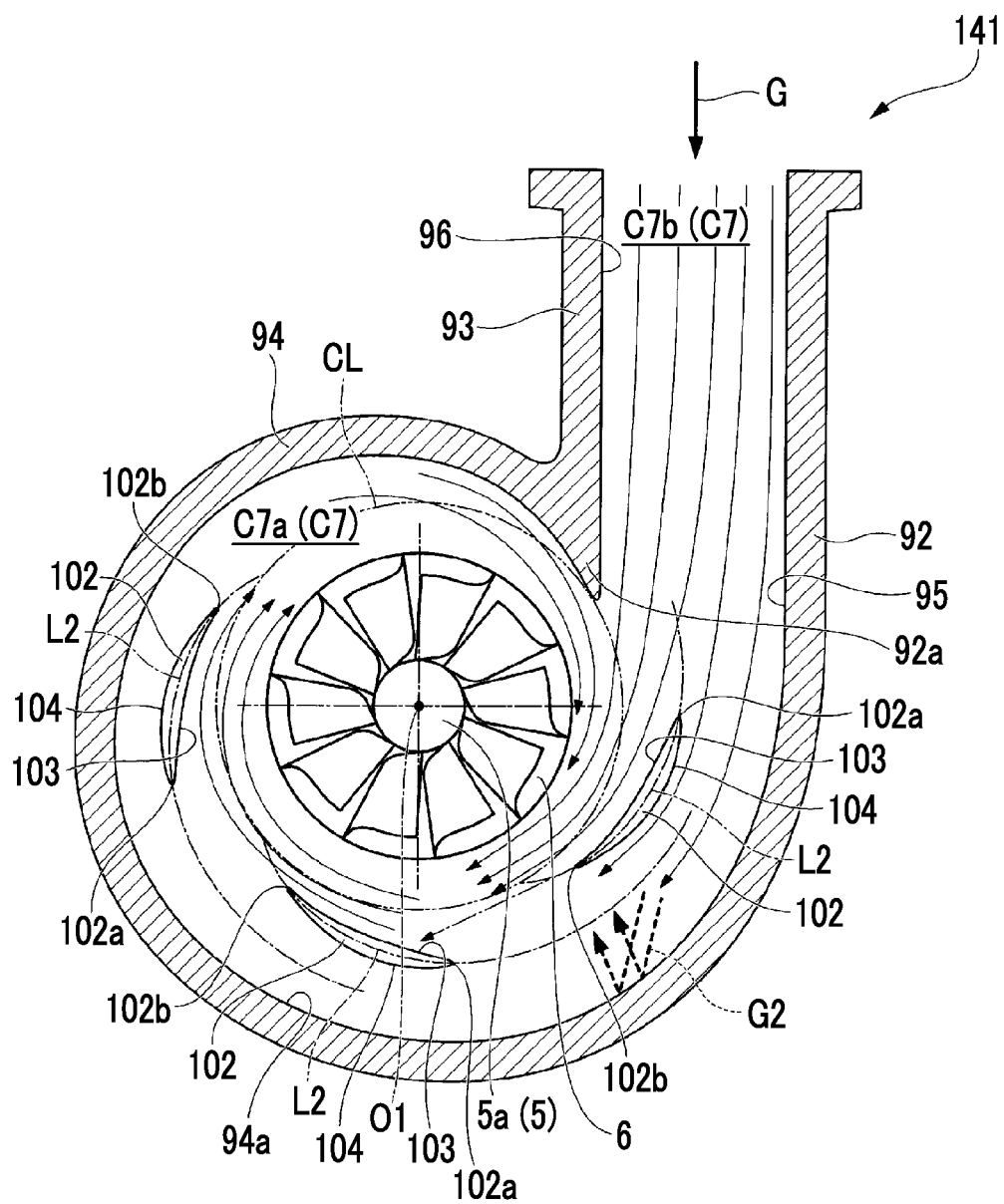
FIG. 19 is a sectional view orthogonal to an axis of a rotary shaft showing a main portion of a turbocharger according to a ninth embodiment of the present invention.

Here, in a case where the scroll guide blade 102 is not provided, the exhaust gas G flowing from the inlet portion 93 is reflected on the wall surface 94a of the scroll portion 94, and a secondary flow G2 toward the inside in the radial direction is generated (refer to broken line arrows in FIG. 19).

However, in the turbocharger 141 of the present embodiment, similarly to the effects obtained by the seventh embodiment, it is possible to introduce the exhaust gas G from the inlet portion 93 in the circumferential direction by the scroll guide blades 102. Accordingly, it is possible to prevent occurrence of the secondary flow G2.

Accordingly, it is possible to decrease a pressure loss by preventing the secondary flow G2, and it is possible to cause the exhaust gas G to uniformly flow when the exhaust gas G flows into the turbine rotor blade 6. As a result, the incidence angle (inflow angle) of the exhaust gas G to the turbine rotor blade 6 is appropriately maintained, and it is possible to improve operation efficiency by decreasing an incidence loss.

[Modification Example of Ninth Embodiment]

Figure 20:
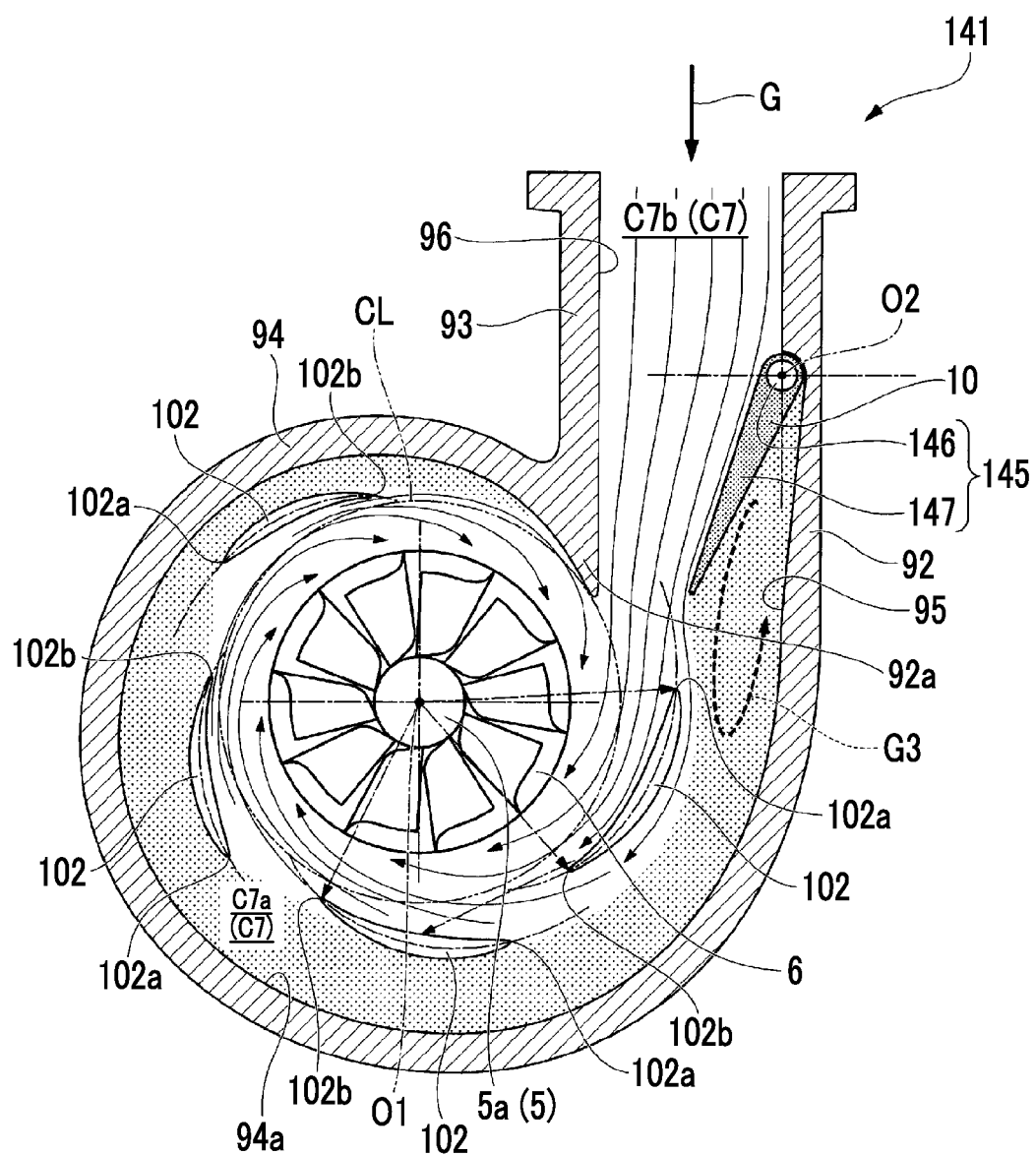
FIG. 20 is a sectional view orthogonal to an axis of a rotary shaft showing a main portion of a turbocharger according to a modification example of the ninth embodiment of the present invention.
Figure 21:
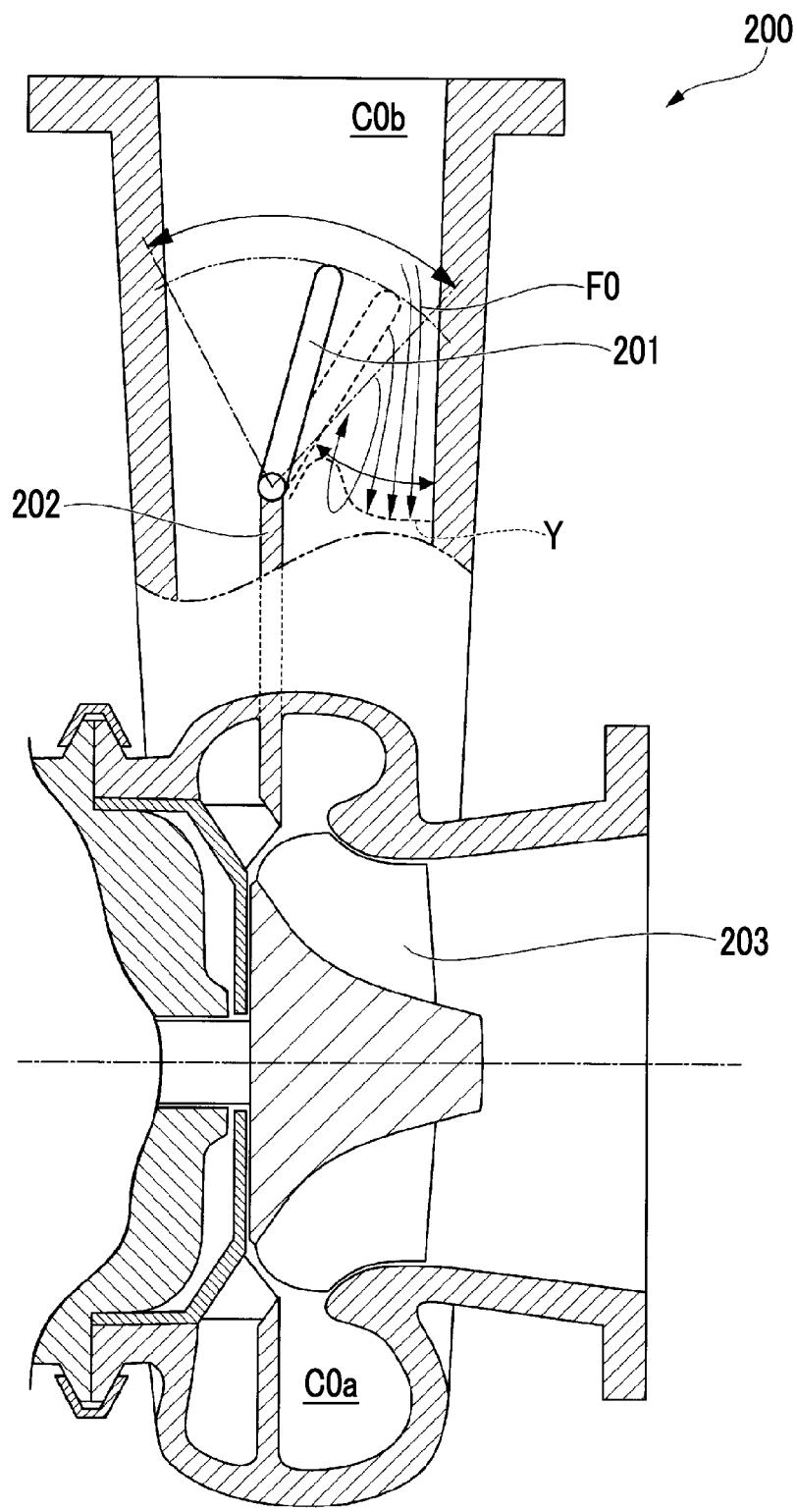
FIG. 21 is a sectional view taken along a surface parallel to an axis of a rotary shaft showing a main portion of a turbocharger in the related art.

As shown in FIG. 20, in the present embodiment, an on-off valve device 145 may be provided in the suction flow path C7b in the inlet portion 93.

The on-off valve device 145 includes a rotating shaft 146 which extends to be parallel in the direction of the axis O1 and is attached to the first wall surface 95 of the inlet portion 93, and a valve body 147 which is attached to the rotating shaft 146 and extends toward the downstream side.

In the example of FIG. 20, the sectional shape of the valve body 147 orthogonal to the axis O1 has a shape which is tapered toward the downstream side. However, the valve body 147 is not limited to this shape.

In addition, since the tip (the end on the downstream side) of the valve body 147 is rotated between the first wall surface 95 and the second wall surface 96 by the rotating shaft 146, the valve body 147 can change the flow path area of the suction flow path C7b in the inlet portion 93.

In the example of FIG. 20, similarly, it is possible to introduce the exhaust gas G in the circumferential direction from the inlet portion 93. In addition, as shown by a broken line arrow in FIG. 20, a backward flow G3 which becomes a separation flow may occur toward the rotating shaft 146 between the valve body 147 and the first wall surface 95. Even in this case, since the exhaust gas around the valve body 147 can be guided in the circumferential direction by the scroll guide blades 102, it is possible to decrease the magnitude of the backward flow G3. Accordingly, it is possible to further decrease a pressure loss.

Hereinbefore, the embodiments of the present invention are described in detail. However, various design modifications can be applied to the present invention within a scope which does not depart from the technical gist of the present invention.

The sectional shape (cross section interesting the flow of the exhaust gas G) of the flow path C (C3, C7) may be various shapes such as a rectangular shape, a circular shape, or an elliptical shape. However, a rectangular shape is preferable.

In addition, the configurations of the embodiments and the configurations of the modification examples may be combined.

Moreover, in the above-described embodiments, the example is described in which the on-off valve device 8 (30, 40, 50, 60, 70) is applied to the turbocharger serving as a rotary machine. However, the on-off valve device can be applied to other rotary machines such as a gas turbine or an expander.

INDUSTRIAL APPLICABILITY

According to the on-off valve device and the rotary machine, since the valve body which forms the upstream-side narrowed flow path and the downstream-side narrowed flow path and has the first surface is provided, it is possible to improve operation efficiency by a simple structure.

REFERENCE SIGNS LIST

1: turbocharger(rotary machine)
2: turbine
3: compressor
4: housing
4a: turbine housing
4b: compressor housing
5: rotary shaft
5a: turbine rotary shaft
5b: compressor rotary shaft
6: turbine rotor blade
7: bearing device
7a: radial bearing
7b: thrust bearing
8: on-off valve device
10: valve body
10a: leading edge
10b: trailing edge
11: rotary portion
14: inlet portion (inflow port)
15: scroll portion
17: wall surface (first wall surface)
18: division wall surface (second wall surface)
18a: tip portion
21: first surface
22: second surface
F1: upstream-side narrowed flow path
F2: downstream-side narrowed flow path
C: flow path
Ca: scroll flow path
Cb: suction flow path
C1: first flow path
C2: second flow path
O1: axis
O2: axis
G: exhaust gas (fluid)
AR: air
S1: static pressure decrease region
30: on-off valve device
31: turbocharger (rotary machine)
32: valve body
32a: leading edge
32b: trailing edge
33: first surface
34: second surface
36: upstream-side opening
37: downstream-side opening
38: through hole portion
38a: inner surface
40: on-off valve device
41: turbocharger (rotary machine)
42: valve body
42a: leading edge
42b: trailing edge
43: first surface
43a: protrusion surface
43b: first recessed surface
43c: second recessed surface
44: second surface
44a: protrusion surface
50: on-off valve device
51: turbocharger (rotary machine)
52: valve body
52a: leading edge
52b: trailing edge
53: first surface
53a: protrusion surface
53b: first recessed surface
53c: second recessed surface
54: second surface
54a: protrusion surface
60: on-off valve device
61: turbocharger (rotary machine)
62: valve body
63: rotary portion
65: opening hole
63a: flanged portion
63b: rotary portion body
63c: shaft member
63d: attachment plate
70: on-off valve device
71: turbocharger (rotary machine)
72: valve body
72A: first valve body
72B: second valve body
72Aa: leading edge
72Ab: trailing edge
72Ba: leading edge
72Bb: trailing edge
73: first surface
81: turbocharger (rotary machine)
82: housing
83: wall surface (first wall surface)
84: division wall
85: division wall surface (second wall surface)
86: through hole
C3: flow path
C3a: scroll flow path
C3b: suction flow path
C4: first flow path
C5: second flow path
91: turbocharger
92: housing
92a: tongue portion
93: inlet portion
94: scroll portion
94a: wall surface
95: first wall surface
96: second wall surface
C7: flow path
C7a: scroll flow path
C7b: suction flow path
10A: valve body
10Aa: leading edge
10Ab: trailing edge
11A: first portion
12A: second portion
33A: first surface
33Aa: protrusion surface
33Ab: recessed surface
34A: second surface
34Aa: first protrusion surface
34Ab: recessed surface
34Ac: second protrusion surface
LC1: center axis
LC2: center axis
LC3: center axis
101: turbocharger (rotary machine)
102: scroll guide blade (guide portion)

102a: leading edge
102b: trailing edge
103: guide surface
104: outer surface
L1: extension line
L2: line segment
GH: high-speed flow
GL: low-speed flow
CL: virtual circle
112: scroll guide blade (guide portion)
112a: leading edge
112b: trailing edge
122: scroll guide blade (guide portion)
122b: trailing edge
G1: back flow
125: fixed nozzle
126: additionally-provided division wall
131: turbocharger (rotary machine)
134: turbine housing
134a: one-side turbine housing
134b: other-side turbine housing
134c: tongue portion
135: division wall
136: fastening tool
141: turbocharger (rotary machine)
G2: secondary flow
145: on-off valve device
146: rotating shaft
147: valve body
G3: backward flow
200: turbine
201: on-off valve
202: division wall
203: turbine rotor blade
F0: working fluid
C0a: scroll flow path
C0b: suction flow path

The invention claimed is:

1. A rotary machine, comprising: a rotary shaft which rotates about an axis;
a turbine rotor blade which rotates along with the rotary shaft;
a housing which covers the rotary shaft and the turbine rotor blade; and
an on-off valve device disposed in the housing,
wherein a scroll flow path is spirally formed continuing to an inflow port of the housing and has a flow path area gradually decreased toward a downstream side of a fluid flow,
a suction flow path is formed to lead from the inflow port to the scroll flow path and the suction flow path is formed between a first wall surface of the housing and a second wall surface of the housing that faces the first wall surface,
the on-off valve device includes a valve body which is configured of a single piece or multiple divided pieces and is disposed in the suction flow path,
the valve body extends from the upstream side toward the downstream side of the fluid flow, and the valve body is rotatably configured in the housing in a direction toward and away from the first wall surface and the second wall surface,
the valve body is configured to have a first surface which faces the first wall surface and gradually goes away from the first wall surface after gradually approaching the first wall surface from the upstream side toward the downstream side of the fluid flow, and a second surface which faces the second wall surface, and
an upstream-side narrowed flow path is formed between the first wall surface and the valve body at an end on the upstream side, and a downstream-side narrowed flow path is formed between the second wall surface and the valve body at an end on the downstream side,
wherein the rotary machine further includes multiple guide portions which are disposed in the scroll flow path to go away from each other in a circumferential direction of the rotary shaft, disposed on the outside in a radial direction of the rotary shaft from the turbine rotor blade, and includes curved guide surfaces facing inwardly in the radial direction, and
each of the guide surfaces in the guide portions positioned on the upstream side in the fluid flow is provided so as to guide the fluid toward the next guide surface in the guide portion positioned on the downstream side.

2. The rotary machine according to claim 1,
wherein each guide portion is formed to have a longitudinal axis along the circumferential direction,
and
wherein among the guide portions adjacent to each other in the circumferential direction, the guide surface at a trailing edge which becomes the end on the downstream side in the guide portion on the upstream side is disposed such that an extension line of a tangential line in a cross section orthogonal to the rotary shaft in the guide surface passes through the guide surface in the guide portion on the downstream side.

3. The rotary machine according to claim 1,
wherein after a thickness dimension of each guide portion gradually increases in the radial direction from a leading edge which becomes the end on the upstream side to a trailing edge which becomes the end on the downstream side, the thickness dimension decreases, and each guide portion is formed in a blade shape when viewed in an extension direction of the rotary shaft of the turbine rotor blade.

4. The rotary machine according to claim 1,
wherein the scroll flow path is formed in a shape in which a flow path area of the scroll flow path decreases in a flow direction of the fluid,
wherein each guide portion is formed in a plate shape extending in the circumferential direction, and
wherein among the guide portions adjacent to each other in the circumferential direction, the leading edge which becomes the end on the upstream side in the guide portion positioned on the downstream side is positioned on the inside in the radial direction of the leading edge in the guide portion positioned on the upstream side.

5. The rotary machine according to claim 1,
wherein the scroll flow path is formed in a shape in which the flow path area of the scroll flow path decreases in the flow direction of the fluid,
wherein each guide portion is formed in a plate shape extending in the circumferential direction, and
wherein among the guide portions adjacent to each other in the circumferential direction, the trailing edge which becomes the end on the downstream side in the guide portion positioned on the downstream side is positioned on the inside in the radial direction of the trailing edge in the guide portion positioned on the upstream side.

6. The rotary machine according to claim 1,
wherein the scroll flow path is formed in a shape in which the flow path area of the scroll flow path decreases in the flow direction of the fluid,
wherein each guide portion is formed in a plate shape extending in the circumferential direction, and
wherein among the guide portions adjacent to each other in the circumferential direction, a dimension in a longitudinal direction along the circumferential direction of the guide portion positioned on the downstream side decreases.

7. The rotary machine according to claim 1,
wherein the housing is formed to be divided in the extension direction of the rotary shaft of the turbine rotor blade, and
wherein the guide portion is integrally formed with the divided one of the housing.

8. The rotary machine according to claim 1,
wherein in the housing, the second wall surface is formed of a division wall surface which divides the scroll flow path into two paths in the direction intersecting the flow direction of the fluid.

\* \* \* \* \*